INVENTOR,
John L. Lindesmith
BY [signature]
ATTORNEY.

May 28, 1957 — J. L. LINDESMITH — 2,793,806

READOUT GATING AND SWITCHING CIRCUIT FOR ELECTRONIC DIGITAL COMPUTER

Filed July 7, 1952 — 14 Sheets-Sheet 2

INVENTOR,
John L. Lindesmith

BY Fred M. Schwend

ATTORNEY.

INVENTOR,
John L. Lindesmith
BY
ATTORNEY.

INVENTOR,
John L. Lindesmith
BY
[signature]
ATTORNEY.

May 28, 1957 J. L. LINDESMITH 2,793,806

READOUT GATING AND SWITCHING CIRCUIT FOR ELECTRONIC DIGITAL COMPUTER

Filed July 7, 1952 14 Sheets-Sheet 5

INVENTOR,
John L. Lindesmith
BY
Fred M. Schwend
ATTORNEY.

May 28, 1957 J. L. LINDESMITH 2,793,806

READOUT GATING AND SWITCHING CIRCUIT FOR ELECTRONIC DIGITAL COMPUTER

Filed July 7, 1952 14 Sheets-Sheet 6

INVENTOR,
John L. Lindesmith

BY Fred N. Schwend

ATTORNEY.

May 28, 1957 J. L. LINDESMITH 2,793,806

READOUT GATING AND SWITCHING CIRCUIT FOR ELECTRONIC DIGITAL COMPUTER

Filed July 7, 1952 14 Sheets-Sheet 7

INVENTOR,
John L. Lindesmith

BY

Fred N. Schwend
ATTORNEY.

INVENTOR,
John L. Lindesmith
BY [signature]
ATTORNEY.

INVENTOR,
John L. Lindesmith
BY [signature]
ATTORNEY.

INVENTOR,
John L. Lindesmith
BY
Paul N. Schmid
ATTORNEY.

May 28, 1957

J. L. LINDESMITH 2,793,806

READOUT GATING AND SWITCHING CIRCUIT FOR ELECTRONIC DIGITAL COMPUTER

Filed July 7, 1952

14 Sheets-Sheet 11

INVENTOR,
John L. Lindesmith

BY

ATTORNEY.

INVENTOR,
John L. Lindesmith

BY

ATTORNEY.

May 28, 1957 J. L. LINDESMITH 2,793,806

READOUT GATING AND SWITCHING CIRCUIT FOR ELECTRONIC DIGITAL COMPUTER

Filed July 7, 1952 14 Sheets-Sheet 13

INVENTOR,
John L. Lindesmith

BY

[signature]

ATTORNEY.

May 28, 1957 J. L. LINDESMITH 2,793,806

READOUT GATING AND SWITCHING CIRCUIT FOR ELECTRONIC DIGITAL COMPUTER

Filed July 7, 1952 14 Sheets-Sheet 14

INVENTOR,
John L. Lindesmith

BY

ATTORNEY.

United States Patent Office 2,793,806

Patented May 28, 1957

2,793,806

READOUT GATING AND SWITCHING CIRCUIT FOR ELECTRONIC DIGITAL COMPUTER

John L. Lindesmith, Sierra Madre, Calif., assignor to Clary Corporation, a corporation of California Application July 7, 1952, Serial No. 297,478

14 Claims. (Cl. 235—61)

This invention relates to electronic computing systems and has particular reference to systems for recording amounts accumulated by such computing systems.

Electronic counting and computing systems are capable of handling data generally in the form of pulses at a relatively high speed, considerably greater than that possible by mechanical computing machines. On the other hand, mechanical computing machines or mechanisms lend themselves more readily to the performance of read-out or recording processes for recording in visible form the factors and results of problems performed by the machine.

In the copending application of J. L. Lindesmith, Serial No. 259,568 filed on December 3, 1951, a system is disclosed for combining a mechanical printing machine with an electronic counter or computer whereby amounts accumulated on the counter may be read out and recorded by the machine at desired times.

This system works very satisfactorily in cases where the pulse input train to the counter can be interrupted during a read-out operation of the printing machine. Such interrupting time is relatively short, i. e., approximately one-third of a second for that particular machine, but in any event this time is longer than the possible repetition time rate of pulses received by the counter. Certain applications of counting or computing are encountered where it is undesirable to interrupt a pulse train for read-out purposes and where it is necessary that all pulses be accumulated, even though such pulses occur at a repetition rate such that the time interval between pulses is possibly shorter than the read-out time.

Accordingly, it is a principal object of the present invention to read out of an electronic counter or accumulator system without interrupting the pulse input train.

Another object is to control a relatively slow speed printing device by a high speed electronic counter or accumulator system without having to interrupt the pulse input train into the system.

Another object is to enable read-out operations from an electronic counter during a pulse counting operation without regard to coincidence or non-coincidence of count pulses and read-out operations, and without losing any of the count pulses.

Another object is to enable read-out operations from an electronic counter or accumulator system concurrently with reception of count pulses by such system.

The manner in which the above and other objects of the invention are accomplished will be readily understood upon reference to the following specification when read in conjunction with the accompanying drawings, wherein:

Fig. 1 is a general schematic view of a preferred computing system embodying the present invention.

Figs. 2–9, inclusive, are circuit diagrams which, when pieced together as shown in Fig. 10, form a complete operating circuit for the computing system.

Fig. 10 is a schematic view showing the manner in which Figs. 2–9 are intended to be pieced together to form a complete circuit diagram.

In the following description, the values of the various electronic elements and voltage sources are given. Although these represent the values found on a preferred embodiment of the invention it should be understood that they are given mainly for the purpose of facilitating an understanding of the circuit arrangements, it being possible that other elements or values may be substituted without departing from the spirit or scope of the invention.

GENERAL ARRANGEMENT

Figure 1:
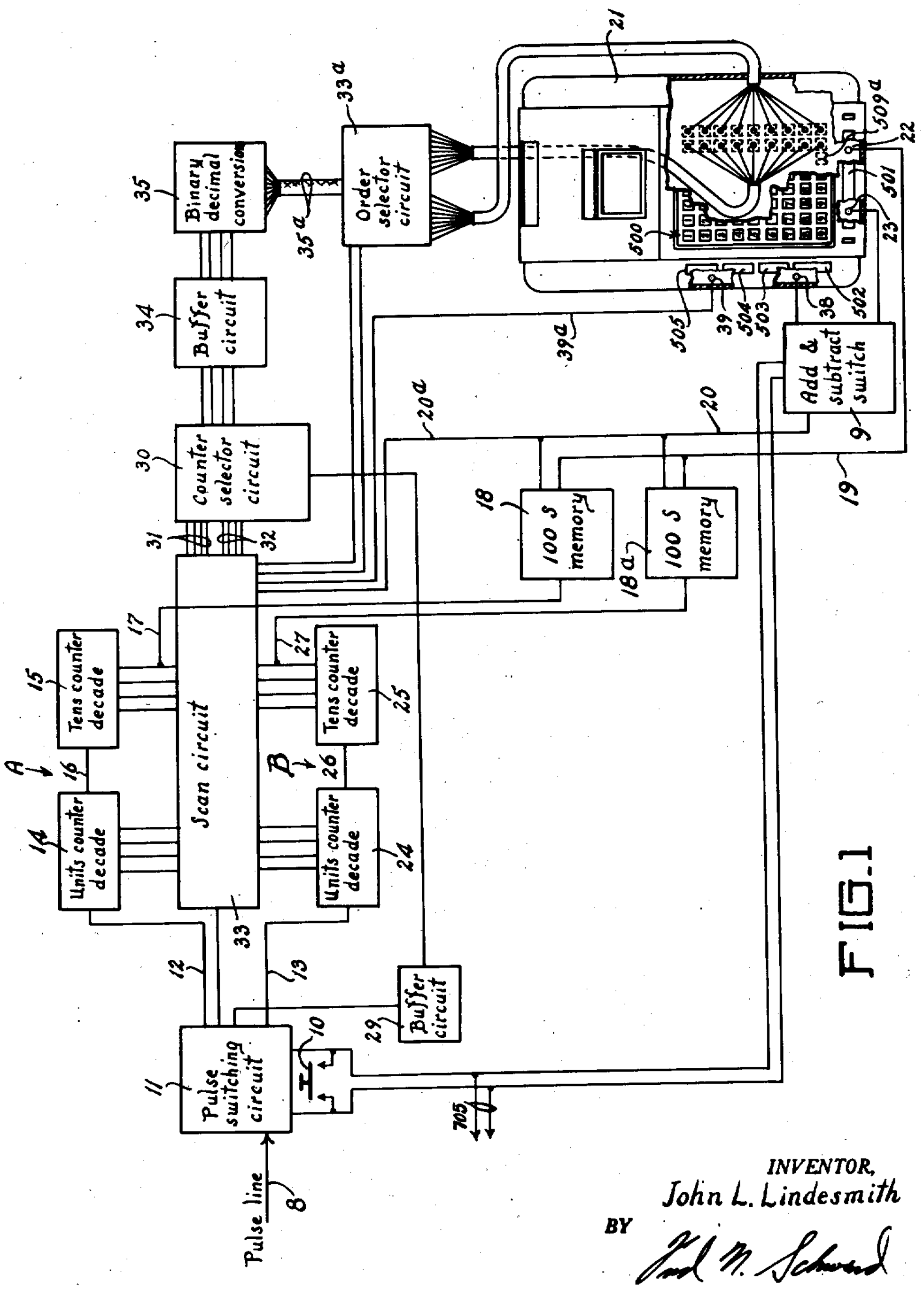

In order to first obtain a general understanding of the preferred embodiment of the invention, reference is made to the schematic layout of the various opearting units of the system as shown in Fig. 1.

Pulses to be counted are entered over line 8 from a suitable emitter or source of pulses to be counted. These pulses are entered into a pulse switching circuit 11 which is effective to transmit the same to one or the other of two pulse lines 12 and 13. The pulse switching circuit 11 is of a bi-stable nature, effective to successively switch the input pulses transmitted by line 8 from one of the lines 12 or 13 to the other upon closing of a normally open read-out switch 10 or throwing of a double pole switch 9 from one pole to the other. Means are also provided to permit automatic operation of the switching circuit 11.

Line 12 is connected to the input of a binary type counter generally indicated at A and comprising, in the present case, two counter decades 14 and 15. The decade 14 has four stages of binary type counter circuits combined with suitable feed-back circuits, as will appear in detail hereinafter whereby the counter circuit will accumulate from "0" to "9" and transfer a carry pulse over a line 16 to the second decade 15 upon accumulation of each ten pulses. The decade 14 is then automatically reset to zero preparatory to the counting of the next ten pulses.

The second counter decade 15 is similar in all respects to that of 14 whereby the two decades have the capacity of counting from "0" to "99." The tenth pulse registered by the counter unit 15, representative of the hundredth pulse received over line 12, is effective to return the decade 15 to zero and to transmit a carry-over pulse along a line 17 to a one-hundreds memory circuit 18 where the same may be either stored temporarily or directed along lines 19 and 20 to a computing machine 21 for the purpose of entering the unit "100" into the machine. The latter is either added to or subtracted from the machine accumulator, depending on the presetting of an add-subtract switch 9.

The machine 21 is provided with a keyboard, printing mechanism and a mechanical accumulator as will be described later on.

The line 19 is connected to a solenoid generally indicated at 22 associated with the number 1 amount key located in the hundreds denomination or order of the keyboard whereby transmission of a pulse from the hundreds memory unit 18 will set this key to effect entry of the value "100" upon operation of the machine. The line 20, on the other hand, is connected through the selectively settable switch 9 to either a solenoid 23 operatively associated with the add control instrumentalities of the machine, or a solenoid 38 operatively associated with the subtract control instrumentalities of the machine. Consequently, energization of the two lines 19 and 20 will effect a registration of the value "100" additively or subtractively on the machine accumulator and recording of this amount by the printing mechanism.

Due to the fact that the rate of counting is scaled down in the ratio of 100 to 1, pulses may be counted with this system at a speed 100 times as fast as the machine is capable of cycling and recording. However, with the inclusion of additional electronic decade units, a greater scaling factor may be obtained to enable the circuit to count pulses at correspondingly higher rates of speed relative to the speed of the machine.

Pulse line 13 is connected to the input of a second counter B comprising two counter decades 24 and 25 connected by a carry-over line 26 and similar in all respects to the counter decades 14 and 15. Likewise, also, the tenth pulse received by the counter decade 25 representative of the 100th pulse received over line 13 is effective to return this counter to zero and to transmit a carry-over pulse over line 27 to a second one-hundreds memory unit 128. The latter is also connected to lines 19 and 20 and is therefore effective to cause registration and printing of the value 100 in the machine 21.

Whenever it is desired to determine and print the total net amount accumulated over a certain period, the switch 10 is closed. This effects a setting of the pulse switching circuit 11 from one condition to the other, i. e., activating the previously inactive one of the counters A and B at the completion of registration of the current count pulse or at the completion of the next succeeding pulse if no pulse is being registered at the time, or at the end of a predetermined time period if count pulses are not currently being received. At the same time, a signal pulse is transmitted through a buffer circuit 29 to a counter selector relay circuit 30. The latter is connected to two sets or trunks 31 and 32 of four data lines each. The data lines 31 are arranged to be sequentially connected to the two counter stages 14 and 15, while the data lines 32 are arranged to be sequentially connected to the two counter stages 24 and 25 by a scan circuit 33.

Thus, the scan circuit sequentially connects the decades 14 and 15 to the lines 31 and thereafter sequentially connects the decades 24 and 25 to the lines 32.

The counter selector circuit 30 is arranged to connect whichever set of data lines 31 and 32 is currently associated with an inactive one of the counters A and B to a matrix buffer circuit 34. The latter controls a binary-to-decimal conversion matrix circuit 35 where the count in a binary form is changed to a decimal form by applying an energizing pulse along a correspondingly valued decimal line of a trunk 35*a* of nine digit lines. The latter are arranged to be selectively connected to the units and tens denominations of the keyboard of the machine 21 through an order selector circuit 33*a* also under control of the scanning circuit 33.

The order selector circuit 33*a* is so related to the scan circuit 33 that when the latter is set to scan a units counter decade, i. e., 14 or 24, the trunk 35*a* will be connected to the units denominational order of the machine keyboard, whereas when the scan circuit 33 is arranged to scan the tens counter stages 15 or 25, the order selector circuit 33*a* will connect the trunk 35*a* to the tens denomination of the machine keyboard. Accordingly, it will be seen that one or the other of the units decades 14 and 24, depending upon the current condition of the pulse switching circuit, will first be scanned and the equivalent decimal value will be entered into the units denomination of the machine keyboard and thereafter the tens decade of the same counter will be scanned and the equivalent decimal value will be entered into the tens denomination of the machine keyboard. Subsequently, the scanning circuit 33 will be effective through lines 20*a* and 20 to energize one or the other of the solenoids 23 and 38, depending on the setting of switch 9. Thereafter, the scanning circuit will, through a line 39*a*, energize a machine solenoid 39, the solenoid 39 being associated with a subtotalling instrumentality within the machine to cause the latter to subtotal and print the net amount registered on the machine accumulator.

*Pulse switching circuit*

The pulse switching circuit 11 (Figs. 1 and 2), as noted heretofore, is effective to switch the count pulse train received over line 8 from one to the other of the two counter input lines 12 and 13 as an incident to closing of the switch 10 or throwing of the switch 9 (Figs. 1 and 8) from one pole to the other. This is accomplished without interrupting the pulse train or without loss of a pulse count, regardless of whether a read-out signal pulse is received by the switching circuit concurrently with or after reception of a count pulse.

For this purpose, the pulse switching circuit 11 effects a switching operation only after a definite period following completion of a count pulse being currently registered or after reception of the next succeeding count pulse in the event no pulse is being received at the time the signal pulse is transmitted, or after a predetermined time lapse in the event count pulses are not being received.

Thus, each count pulse will be registered on either one or the other of the counters A and B, but never on both, and by virtue of the pulse switching system for alternately transmitting pulses to one or the other of the electronic counters, adequate time may be given the computing machine 21 to accumulate and record amounts from the inactive counter without having to interrupt the pulse train.

Figure 2:
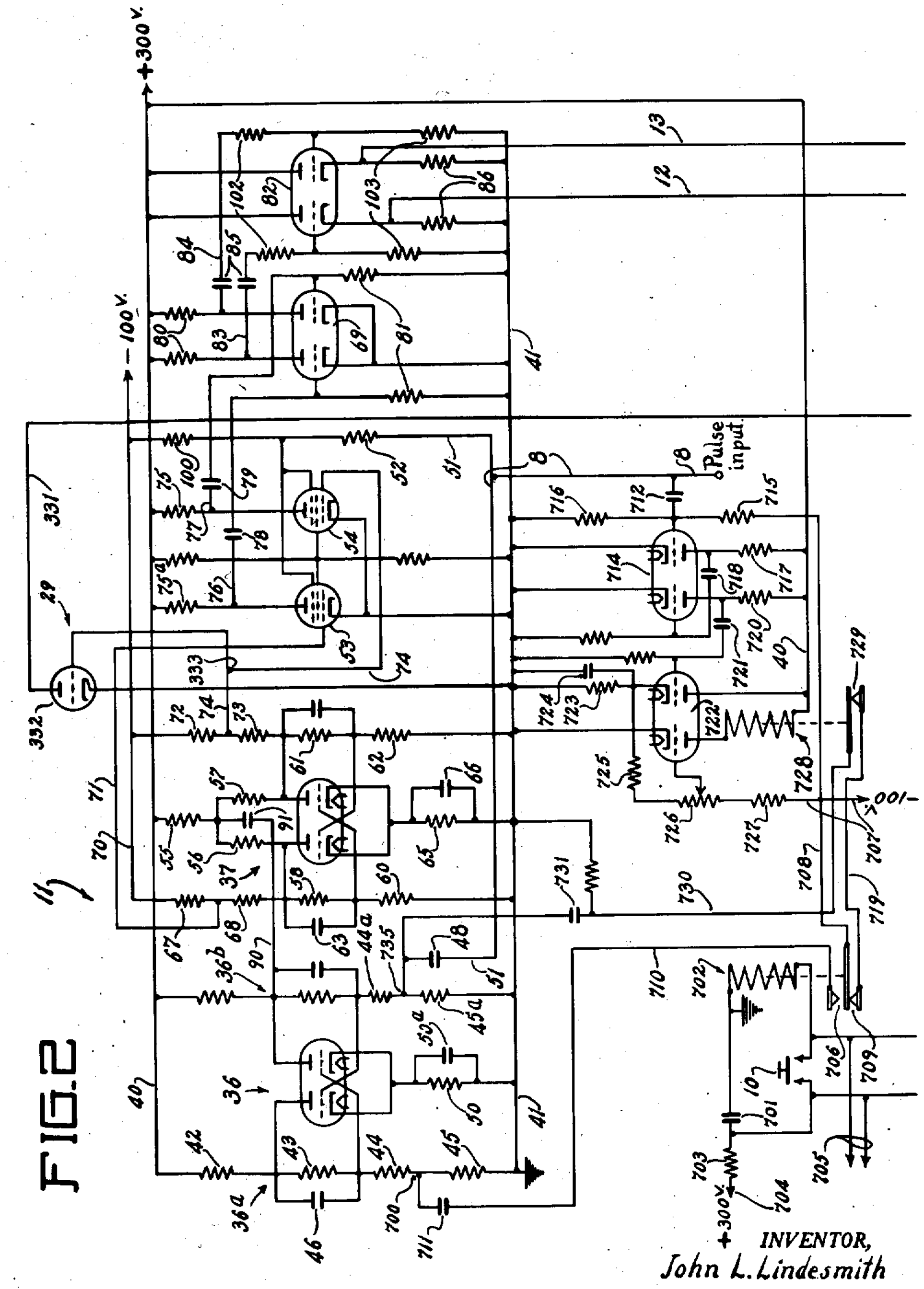
Figure 3:
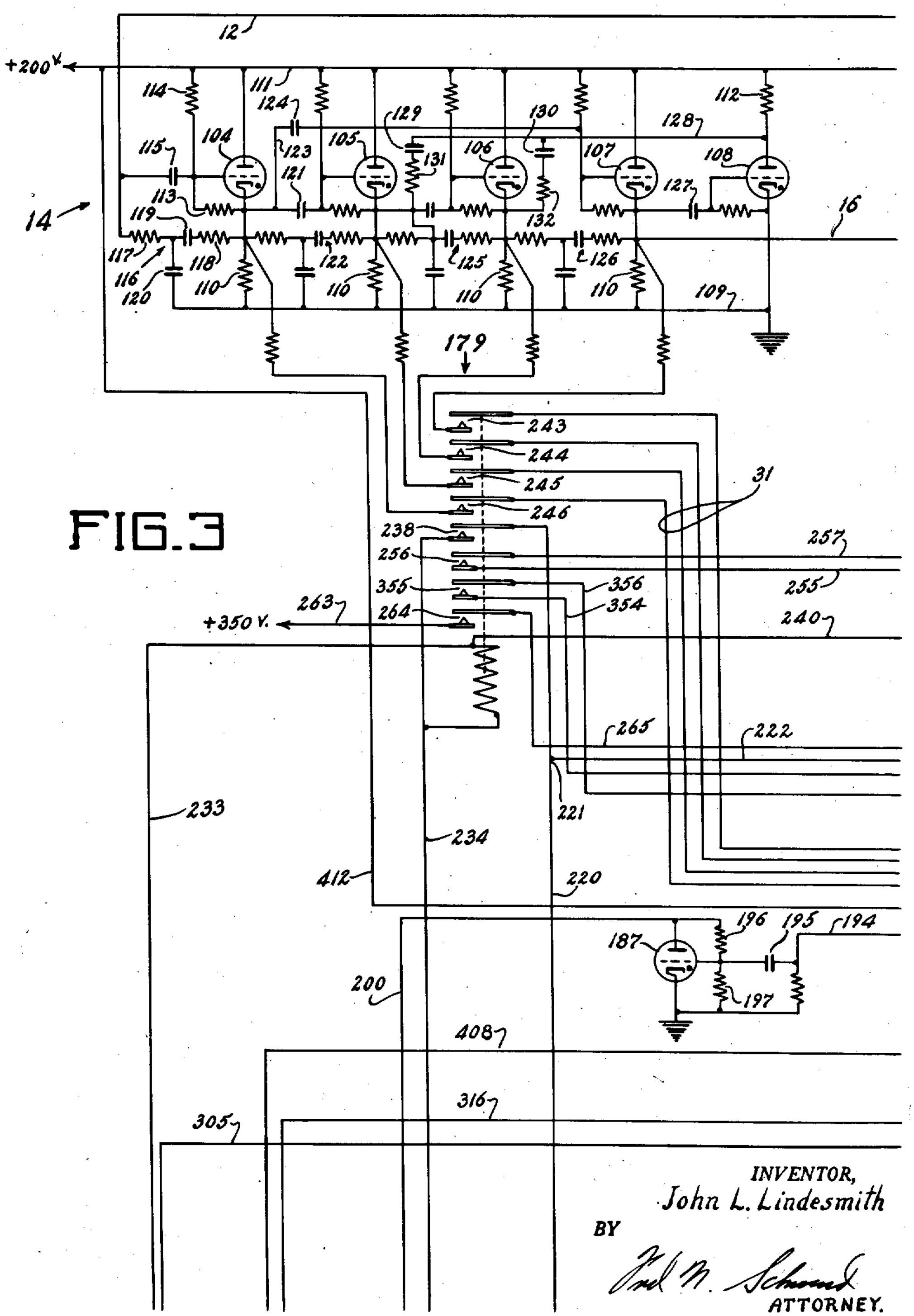

Referring to Fig. 2, the pulse switching circuit 11 comprises a pair of bi-stable trigger circuits 36 and 37, each including a duo-triode tube, preferably of the 12AU7 type.

The trigger circuit 36 includes two voltage divider networks 36*a* and 36*b* connected between a plus 300 volt supply line 40 and a ground line 41. The networks 36*a* and 36*b* include resistors of similar values, the network 36*a* comprising resistors 42, 43, 44 and 45 of 47,000 ohms, 100,000 ohms, 27,000 ohms and 18,000 ohms, respectively. The resistor 42 is located in the anode circuit of the left-hand triode of the trigger tube. The resistor 43 is shunted by a condenser 46 of 270 mmfd. and the lower juncture of these elements is connected to the grid of the right-hand triode of the tube.

The count pulse input line 8 is connected through a coupling condenser 48 of 50 mmfd. to the juncture of resistors 44*a* and 45*a* of the divider network 36*b*.

The cathodes of the tube are connected to ground line 41 through a resistor 50 of 12,000 ohms shunted by a condenser 50*a* of .01 mfd.

Although the trigger circuit 36 is of the bi-stable type, the right-hand section thereof is normally maintained in a conducting condition during a pulse counting operation, as will appear hereinafter. Thus, with the right-hand tube triode conductive, its anode is held at a low potential and the resistance coupled grid of the left-hand triode is at a still lower potential, thus maintaining the left-hand triode blocked. Accordingly, the anode of the left-hand triode is at a high potential, so that the resistance coupled grid of the right-hand section is held above cut-off, maintaining it in a conductive condition.

The count pulses are preferably of a positive nature and of approximately 40 volts amplitude, and accordingly, normally have no effect on the trigger 36. This is so, since the values of resistors 44*a* and 45*a* and the bias applied to the grids of the two triodes are of such value as to prevent the positive or rise portion of each pulse, as differentiated by the condenser 48 and these resistors, from affecting the left-hand triode grid sufficiently to trigger the circuit. However, these pulses are transmitted through a line 51 and resistor 52 of 68,000 ohms to the upper control grids of two 6AS6 gate tubes 53 and 54. The latter grids are normally biased to cut-off condition by a resistor 100 of 470,000 ohms connected between a minus 100 volt bias supply line 70 and the upper grids of tubes 53 and 54.

The tubes 53 and 54 are alternately biased by means of their lower control grids, from the trigger circuit 37, to such a condition that one or the other of these tubes will be rendered conducting upon receipt of a pulse over line 51, the particular tube so affected depending upon the condition of the trigger circuit 37.

The trigger circuit 37 is generally similar to the trigger circuit 36 but differs in certain details as follows. A voltage divider network is provided for each side of the trigger stage and comprises a common resistor 55 of 18,000 ohms connected at one end to plus supply line 40, and connected at the other end thereof to resistors 56 and 57, both of 47,000 ohms, located in the anode circuits of the two triodes of the trigger tube. Resistor 56 is connected in series with resistors 58 and 60, the latter being connected to ground line 41. Likewise, resistor 57 is connected in series with resistors 61 and 62 to the ground line. A condenser, like 63, of 270 mmfd. is connected across each of the resistors 58 and 61, and the lower end of such resistors are cross-connected to the grids of the opposite triodes.

The cathodes of both triode sections are connected to ground through a resistor 65 of 12,000 ohms shunted by a condenser 66 of .01 mfd.

A pair of resistors 67 and 68 of 470,000 ohms each are connected in series between the juncture of resistors 56 and 58 and the minus 100 volt bias supply line 70, and the juncture of these two resistors is connected by line 71 to the lower control grid of the left-hand gate tube 53. Likewise, a pair of resistors 72 and 73 are connected in series between the juncture of resistors 57, 61 and the negative bias line 70. The juncture of the two resistors 72 and 73 is connected by line 74 to the lower control grid of the right-hand gate tube 54.

The values of the various elements of stage 37 and the voltages applied thereto are such that one of the lines 71 and 74 will have applied thereto a voltage of approximately plus 50 volts and the other a voltage of approximately minus 50 volts.

The anodes of tubes 53 and 54 are connected to the plus supply line 40 through resistors 75 and 75*a*, respectively, each of 100,000 ohms, while the cathodes of these tubes are connected directly to the ground line 41.

Assuming the right-hand triode of trigger stage 37 to be conducting, its anode circuit would be operating at a lower potential, resulting in a lowered potential drop across resistors 72 and 73 and thereby fixing the bias on the lower control grid of gating tube 54 at approximately minus 50 volts. This value is such as to prevent conduction of tube 54 in response to a positive count pulse applied to the upper grid thereof. However, since the anode circuit of the now non-conducting left-hand triode of the trigger stage 37 is at a high potential, the bias on the lower control grid of gate tube 53 is sufficiently high to enable conduction of the tube upon reception of the count pulse or pulses along line 51.

The anodes of the two gate tubes 53 and 54 are coupled through lines 76 and 77 and condensers 78 and 79, respectively, each of .01 mfd., to the grids of the two triode sections of a 12AU7 amplifier tube 69. The anodes of the tube 69 are connected through resistors 80, each of 100,000 ohms, to the plus supply line 40 and both triodes are normally held in conducting condition, just above the cut-off point, by grid resistors 81, each of 470,000 ohms, while the cathodes are connected directly to ground line 41.

The anodes of tube 69 are in turn connected through lines 83 and 84, condensers 85, each of .01 mfd., and resistors 102, each of 330,000 ohms, to the grids of the two triode sections of a 12AU7 inverter tube 82. The latter triodes are normally biased to nonconducting condition through cathode resistors 86, each of 33,000 ohms and grid bias resistors 103, each of 470,000 ohms, and are coupled as cathode followers to the aforementioned pulse input lines 12 and 13 connected to the input circuits of the two electronic counter units A and B.

Accordingly, count pulses transmitted over line 51 will be gated by one or the other of the gate tubes 53 and 54, thereafter amplified and inverted by the tubes 69 and 82, and thereafter applied through the corresponding one of the lines 12 and 13 to the respective counter unit as positive pulses. However, upon reception of a negative signal or read-out pulse of approximately 100 volt amplitude at the point 700 of trigger circuit 36 (as will appear later), the fall portion of this pulse will lower the potential of the grid of the right-hand section of trigger 36 sufficiently to flip the same, causing the left-hand side to become conducting and the right-hand side nonconducting. Due to its bi-stable nature, the stage will remain in this condition, and as the next count pulse is received over line 8, the rise portion of this count pulse will have no effect on the trigger, since the grid of the left-hand triode is now at a high potential, but the fall portion of the pulse will lower the potential of this grid sufficiently to block the left-hand triode and again cause the right-hand section to become conductive. The resultant drop in potential of the anode of the right-hand triode will be applied as a negative pulse along line 90 and through condenser 91 of 50 mfd. to the lower terminal of the resistor 55 in the voltage divider network for stage 37, thereby triggering the latter stage and reversing the conditions of tubes 53 and 54 so as to gate the succeeding counting pulses through the previously inactive sides of tubes 69 and 82 and eventually to the previously inactive one of the counters A and B.

It should be noted that the inherent minute delay effected in switching the triggers 36 and 37 will insure that the counting pulse which had effected the switching will be transmitted through the currently open gate tube 53 or 54 before the switching operation takes effect. The components of the circuit are such that this time delay will be on the order of two microseconds, thereby enabling proper counting and read-out of count pulses at a relatively rapid repetition rate.

Describing now the means for applying a signal or read pulse to the trigger circuit 36, the manually operable read switch 10 is located in circuit with a condenser 701 of 4 mfd. and the coil of a read relay 702. One side of the condenser 701 is grounded and the other side is connected through a 100,000 ohm resistor 703 to a plus 300 volt supply source 704. Thus, the condenser 701 is normally charged, and upon closing the switch 10 the same is discharged through the coil of relay 702, energizing the latter. In lieu of switch 10, the relay 702 may be automatically energized from an outside source through lines 705.

The relay 702 operates to close make contacts 706 to complete a circuit from a minus 100 volt bias supply line 707, line 708, contacts 706, line 710 and coupling capacitor 711 of 200 mmfd. to the point 700 of the trigger circuit 36, thus flipping the latter circuit in the manner previously noted. Thus, upon reception of the next count pulse over line 8, the circuit 36 will be returned to its former status to effect the aforementioned switching operation.

Describing now the arrangement for causing a switching operation of the circuit 11 upon closing of the switch 10, and in the event that no count pulses are being received or in the event such pulses are being received at intervals greater than approximately one second, the count pulse line 8 is connected through a capacitor 712 of .05 mfd. to the grid of the right-hand triode of a 12AU7 tube 714. The latter triode is normally biased to nonconducting condition by a bias resistor 715 of 470,000 ohms connected between the grid and the minus supply line 707. The resistor 715 forms part of a voltage divider network, the other part of which comprises a resistor 716 of 270,000 ohms connected to the ground line 41. Thus, as each count pulse is transmitted over line 8, it renders the right-hand triode of tube 714 conducting and the consequent drop in potential over a 100,000 ohm anode resistor 717 is applied as a negative pulse over coupling capacitor 718 of .05 mfd. to the grid of the left-hand triode of tube 714. The latter triode is normally conducting, its anode having in circuit therewith a 100,000 ohm resistor 720 and its grid connected through a 470,000 ohm resistor to ground line 41. As the latter is rendered nonconducting by a negative pulse transmitted to the grid thereof by condenser 718, the consequent rise in potential of the anode thereof is transmitted as a positive pulse over coupling capacitor 721 of .05 mfd. to the grid of the right-hand triode of a second 12AU7 tube 722. The anode of the latter triode is connected directly to the plus supply line 40 while its cathode is connected to the ground line 41 through a 10 megohm resistor 723 shunted by a .5 mfd. capacitor 724. The latter triode acts as a cathode follower, the cathode being connected through a voltage divider circuit to the negative bias line 707. The divider circuit comprises resistor 725 of 3.9 megohms, a potentiometer 726 of .5 megohms and a resistor 727 of 4.7 megohms. The adjustable element of the potentiometer 726 is connected to the grid of the left-hand triode of tube 722 and is so adjusted as to normally maintain this triode in nonconducting condition. The anode of the latter triode is connected to the plus supply line 40 through the coil of an integrator relay 728 and its cathode is connected directly to the ground line 41.

The time constant of resistor 723 (combined with the above-noted resistor 725 and potentiometer) and capacitor 724 is of such a value that the grid of the left-hand triode of tube 722 will be held positive to maintain this triode conducting and the relay 728 energized for a period of approximately one second after the right-hand triode of the tube has become momentarily conductive. This time period may be varied as desired by adjustment of the potentiometer 726. Break contacts 729 of relay 728 are arranged to complete a circuit from the minus 100 volt bias supply line 707, line 708, break contacts 709 of the read relay 702, line 719, contacts 729, line 730, capacitor 735 of 200 mmfd. to point 731 of the trigger circuit 36. Thus, if the count pulse frequency is greater than one per second or if a read operation is initiated within one second after the last count pulse has been received, the integrator relay 728 will be held energized, opening the latter circuit including contact 729 so that the latter circuit can have no control over the trigger circuit 36. However, if more than one second has elapsed since the last count pulse has been registered and the read switch 10 is closed, the make contact 706 of read relay 702 will be closed as aforementioned, to flip the trigger circuit 36. Thereafter, as the switch 10 is opened, the break contacts 709 of relay 702 will close, completing the aforementioned circuit from the bias line 707 through contacts 709, and now closed contacts 729 of relay 728, to transmit a negative pulse through condenser 731 to return the trigger 36 to its original condition and thereby effect operation of the switching circuit 11.

Figure 16:
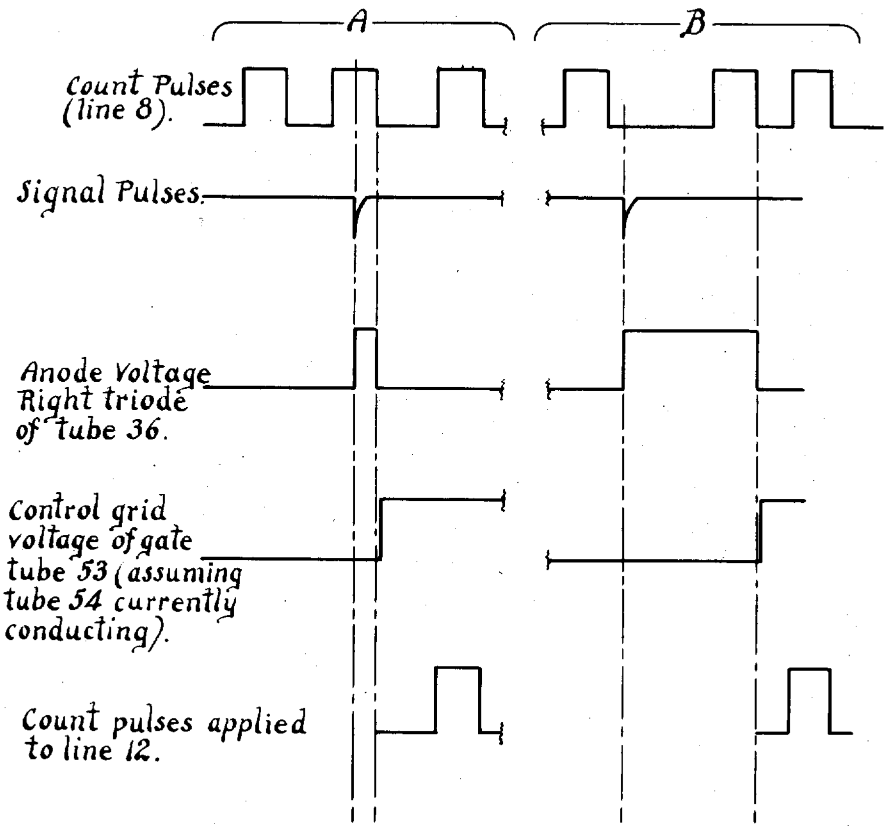
Fig. 16 is a schematic view illustrating pulse forms and voltage potentials at strategic points in the system.

The relationship between the wave forms of the signal and count pulses and voltage potentials in strategic points in the system is shown in Fig. 16.

In column A is shown the relationship of pulses and voltages when a signal pulse is received concurrently with a count pulse. Column B illustrates the relationship of voltages when a signal pulse is received in the absence of a count pulse.

It will be noted that when a signal pulse is applied, the multi-vibrator 36 (Fig. 2) is immediately reversed in condition, causing the anode voltage of the right hand triode to rise and the anode voltage of the left hand triode to drop. This condition remains until reception of the trailing edge (negative going portion) of either the currently received count pulse or reception of the trailing edge of the next succeeding pulse, in the event the signal pulse is received in the absence of a count pulse.

Since the control of the gate tubes 53 and 54 is under control of the multi-vibrator 36, the switching effect thereof is substantially immediately responsive to the change in state of the multi-vibrator 36 as the latter receives the trailing edge of a count pulse. Therefore, it is assured that the next succeeding count pulse will be properly gated by one or the other of the gates in tubes 53 and 54. Since the switching action becomes effective only directly after the trailing edge of a current or succeeding count pulse is received, such switching action can only occur when no count pulse is received even though the pulse repetition rate is relatively high.

*Counter decade units*

The four electronic counter decades 14, 15, 24 and 25 are shown in detail in Figs. 3 to 6, inclusive. However, since these units are similar in circuitry and function, only that shown in Fig. 3 will be described in detail.

Each counter unit comprises five gaseous, cold cathode glow discharge type tubes, preferably of the type commercially available as No. 5823. The first four tubes 104 to 107 constitute the actual counting section capable of counting in the binary system, whereby the tube stages represent the decimal values 1, 2, 4 and 8, respectively, progressing from the left. The fifth tube 108 is effective to reset the remaining tubes to zero indication upon the count of 10 being accumulated in the decade unit.

The cathode of each of the four counting tubes is connected to a ground line 109 through a resistor 110 of 33,000 ohms while the anode of each of these tubes is connected directly to a plus 200 volt supply line 111. The reset tube 108 has its cathode connected directly to the ground line 109, while its anode is connected to the plus supply line through a resistor 112 of 150,000 ohms.

A 470,000 ohm resistor 113 is placed in the cathode-igniter circuit of each of the counting tubes and cooperates with a 1 megohm resistor 114 connected between the plus supply line 111 and the igniter to normally bias the igniter to a point just below the firing potential of the tube.

When the counter unit is in zero indicating condition all four counting tubes are conducting and the reset tube 108 is nonconducting.

Pulses supplied from the pulse switching circuit 11, along the input conductor, i. e., line 12, are transmitted concurrently through a coupling capacitor 115 of 680 mmfd. to the igniter and through an R. C. delaying network 116 to the cathode of the first counting tube 104. The latter delay circuit includes two 4,700 ohm resistors 117 and 118, a .015 mfd. capacitor 119 and a .005 mfd. capacitor 120, the capacitor 120 being connected between the ground line 109 and the juncture of resistor 117 and capacitor 119. By virtue of this delay circuit, a positive pulse received over the input conductor 12 is first applied to the igniter of the counter tube 104, but since the latter is in a conducting state when registering zero, this pulse will have no effect. Shortly thereafter, however, the same pulse is transmitted through the delay circuit 116 to raise the potential of the cathode of the tube sufficiently to render the same nonconductive. This will leave the counter decade unit 14 representing the binary value 0001, equivalent to the decimal value "1."

The second count pulse transmitted over line 12 will be transmitted through the condenser 115 to the igniter of the tube 104, raising the potential thereof sufficient to cause conduction of the tube. The voltage drop across the resistor 110 will accordingly increase, applying a positive pulse across a second coupling condenser 121 of 680 mmfd. and a second delay circuit 122 similar in all spects to the delay circuit associated with the first count-g tube 104. The process involved in igniting the second be 105 is similar to that followed in controlling the st, i. e., the positive pulse transmitted to the igniter the second tube 105 will now have no effect on this be since it is already in conducting condition, but as e pulse is eventually transmitted by the delay circuit !2, the cathode of tube 105 will be raised above cut-off ›tential, leaving the tube extinguished and leaving the ›unter unit in a condition representing the binary term ›010," equal to the decimal value "2." In the mean-ne, a positive pulse will also be transmitted through a ıe 123 and capacitor 124 of 680 mmfd. to the igniter ' the fourth counter tube 107, but since this tube is ready conducting, such positive pulse will have no fect thereon.

Application of the third count pulse will have no direct fect on the igniter of the now conducting tube 104, but ill be transmitted to the cathode thereof through the :lay circuit 116, rendering the tube nonconducting to ave the unit in a condition representing the binary term ›011" equal to the decimal value "3."

The fourth count pulse transmitted by the conductor t will be applied to the igniter of the now nonconduct-g tube 104, rendering the same conductive, and the 'op potential across the tube will transmit a positive ılse in the same manner as before to the igniter of the ›w nonconducting tube 105, thereby likewise rendering .e latter tube conductive. In a like manner, the rise potential of the cathode of tube 105 will transmit a ›sitive pulse through a third delay circuit 125 to the ıthode of the third counting tube 106, raising the poten-ıl of the latter cathode to extinguish this tube and ıereby registering the binary value "0100," i. e., the :cimal value "4."

The fifth counting pulse will merely be transmitted ırough the first delay circuit to raise the cathode poten-al of tube 104 to extinguish this tube, leaving the counter ıit in a binary "0101" condition. The sixth pulse will ;ain raise the igniter potential of the tube 104 to render ıe tube conducting and effect a transfer into the second ıbe 105, causing the latter to extinguish and leaving the ›unter unit in a binary "0110" condition. The seventh ılse will again render the first tube 104 nonconducting ı the usual manner, leaving the counter unit in a binary ›111" condition.

The eighth pulse will render tube 104 conducting in ıe usual manner and the carry pulse operation resulting ıerefrom will render the tube 105, and thereafter tube 06, conductive, thereby applying a positive potential ırough a fourth delay circuit 126 to the cathode of the .st counter tube 107, extinguishing the latter and leav-ıg the counter in a binary "1000" condition. The carry ılse transmitted by the delay circuit 126 incident to ıtinguishing tube 107 is also applied through a con-:nser 127 of 680 mmfd. to the igniter of the reset tube 08, causing the latter to conduct. The resultant increase ı potential drop across the resistor 112 applies a nega-ve pulse along line 128 and through condensers 129 ıd 130 of .033 mfd. each, resistors 131 and 132 of ,200 ohms each, to the cathodes of tubes 105 and 106. .t this time, however, the latter tubes are already con-ıcting, and such negative pulses will have no effect ıereon.

The ninth pulse will merely render the tube 104 non-›nducting, causing the counter to assume the binary 1001" condition.

The tenth count pulse will render the tube 104 con-ıcting and the consequent increase in potential of its ıthode will be applied through the delay circuit 122 ısociated therewith to the cathode of the tube 105 and ›ncomitantly through the line 123 and capacitor 124 › the igniter of the tube 107 which, it will be recalled, now in nonconducting condition. The latter tube now ›nducts and the consequent increase in potential of its cathode will be transmitted as a positive pulse through condenser 127 to the reset tube 108.

Thus, the cathode of tube 105 is held sufficiently negative at this time by the feed-back pulse from the anode circuit of the reset tube 108 so that the resultant increase in potential at its cathode due to the carry-pulse applied thereto through delay circuit 122 will be insufficient to extinguish this tube. Likewise, the cathode of tube 106 is held sufficiently negative by the feed-back pulse from the reset tube 108 to prevent extinguishing of tube 106. Consequently, all of the couting tubes at this time will be conducting, leaving a counter circuit in a binary "0000" condition.

As positive potential is removed from the igniter of the reset tube 108, the latter returns to its normal nonconducting condition.

Figure 4:
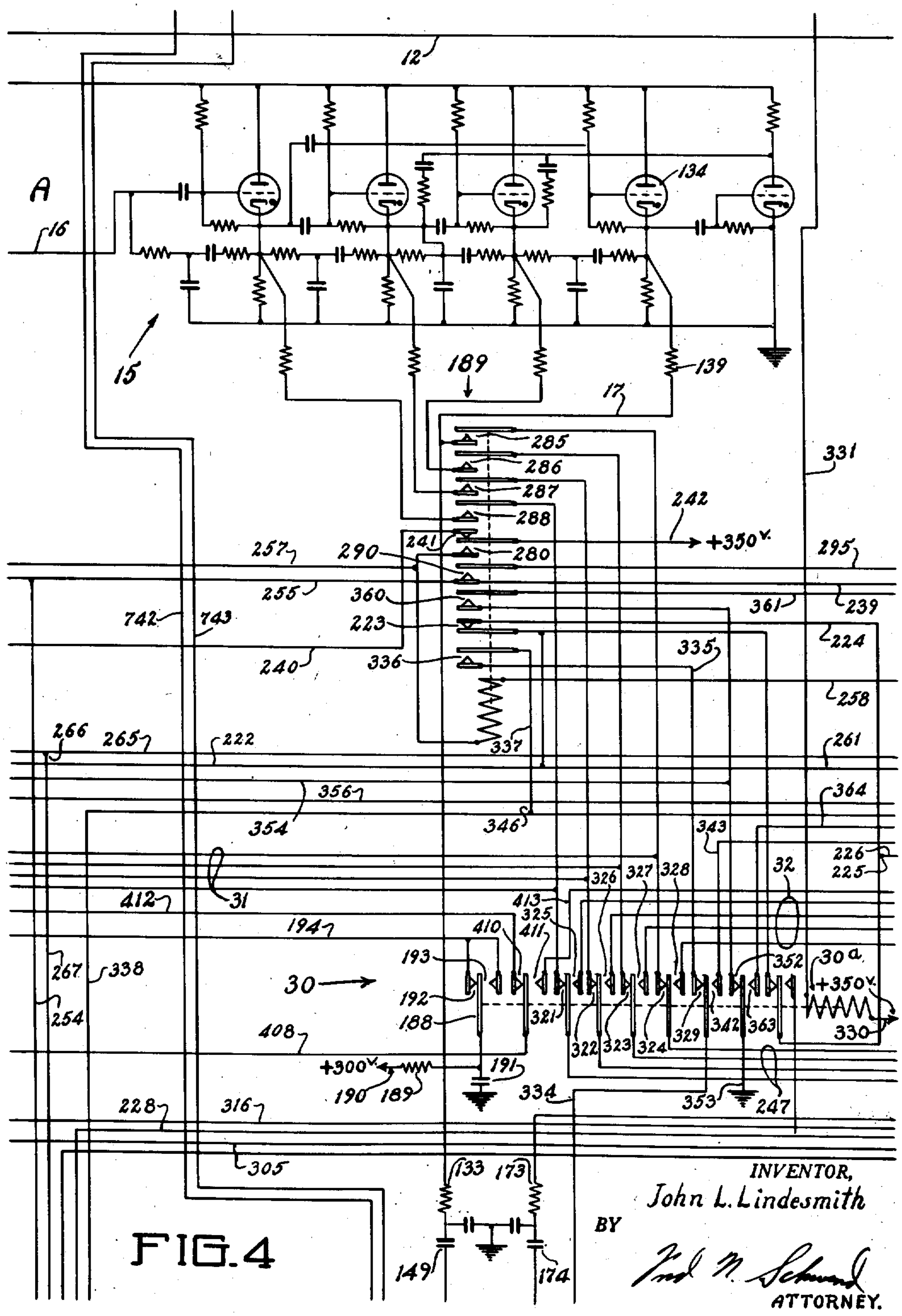
Figure 5:
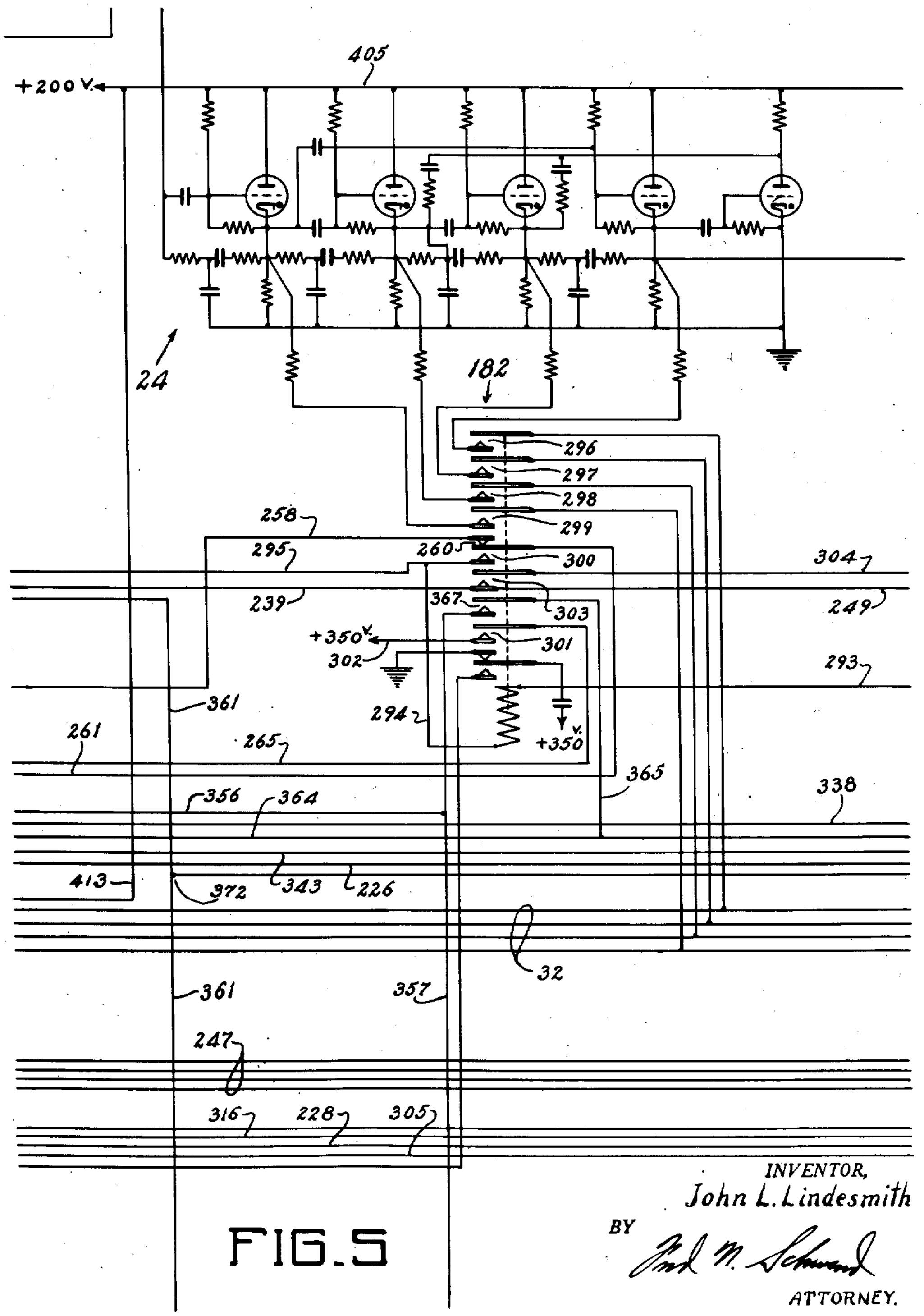
Figure 6:
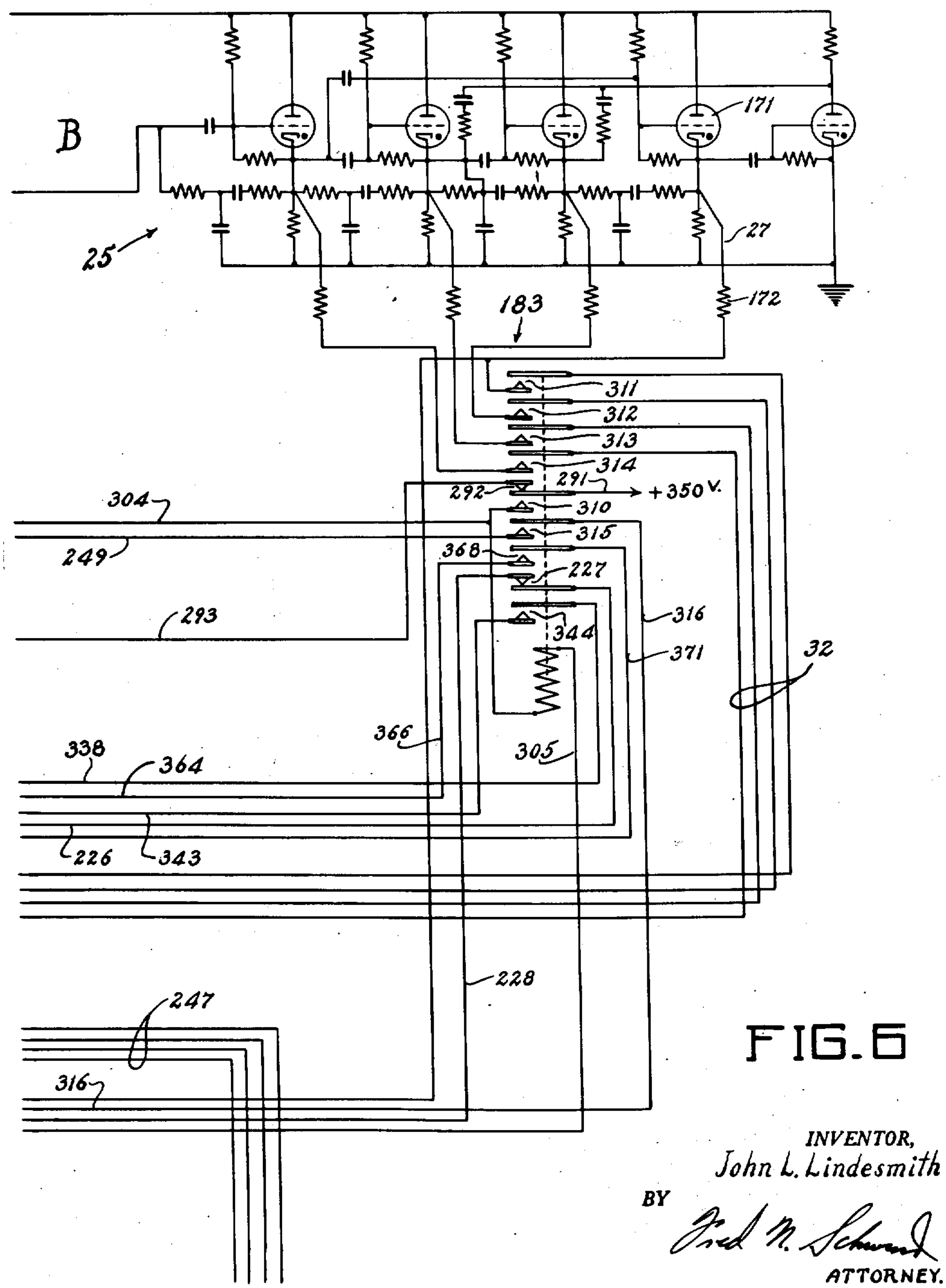

The rise in potential of the cathode of tube 107 incident to registration of the tenth pulse will transfer a positive tens count or carry-over pulse to the input conductor 16 for the second (tens) decade couner unit 15 (Fig. 4).

The tens decade counter unit 15 accumulates a count in a binary sense in the same manner as the above-described units counter unit and upon registration of the count of 10 therein, representative of the total registration of the count "100," the cathode of the last counting tube will rise sharply in potential. This change in potential is applied as a hundreds carry-over pulse through isolating resistor 139 of the 100,000 ohms, line 17 (see also Fig. 8), resistor 133 of 100,000 ohms, a coupling capacitor 149 of .001 mfd. to the input of the memory unit 18 where it is transmitted directly to the read-out machine, or temporarily stored therein, as will be described hereinafter.

From the above it will be seen that amounts accumulated in either of the counter decade units will be represented in a binary sense by the potentials appearing on the cathodes of the four counting tubes in those units.

*Memory unit*

As pointed out before, the memory units 18 and 18a (Figs. 1 and 8) either transmit the data representing the value "100" immediately to the computing machine, or temporarily store the same. If the machine is at rest at this moment, the value "100" will be directly transmitted to the machine, actuating the solenoid 22 and one or the other of the add and subtract solenoids 23 and 38, respectively, depending upon the setting of switch 9. However, if the machine is currently operating to read out amounts or to register the one hundreds unit from a previously inactive one of the counters, and the opposite counter has been so filled that only a few pulses applied to the latter counter will cause a one hundreds unit to be transmitted to its respective memory unit, the latter unit will be stored until the machine completes its cycle, at which time a new cycle will immediately follow to enter the one hundreds unit.

The two memory units 18 and 18a are similar in all respects in structure and function and therefore only one will be described in detail, although reference will be had to both in instances where interrelation exists between the two.

Figure 7:
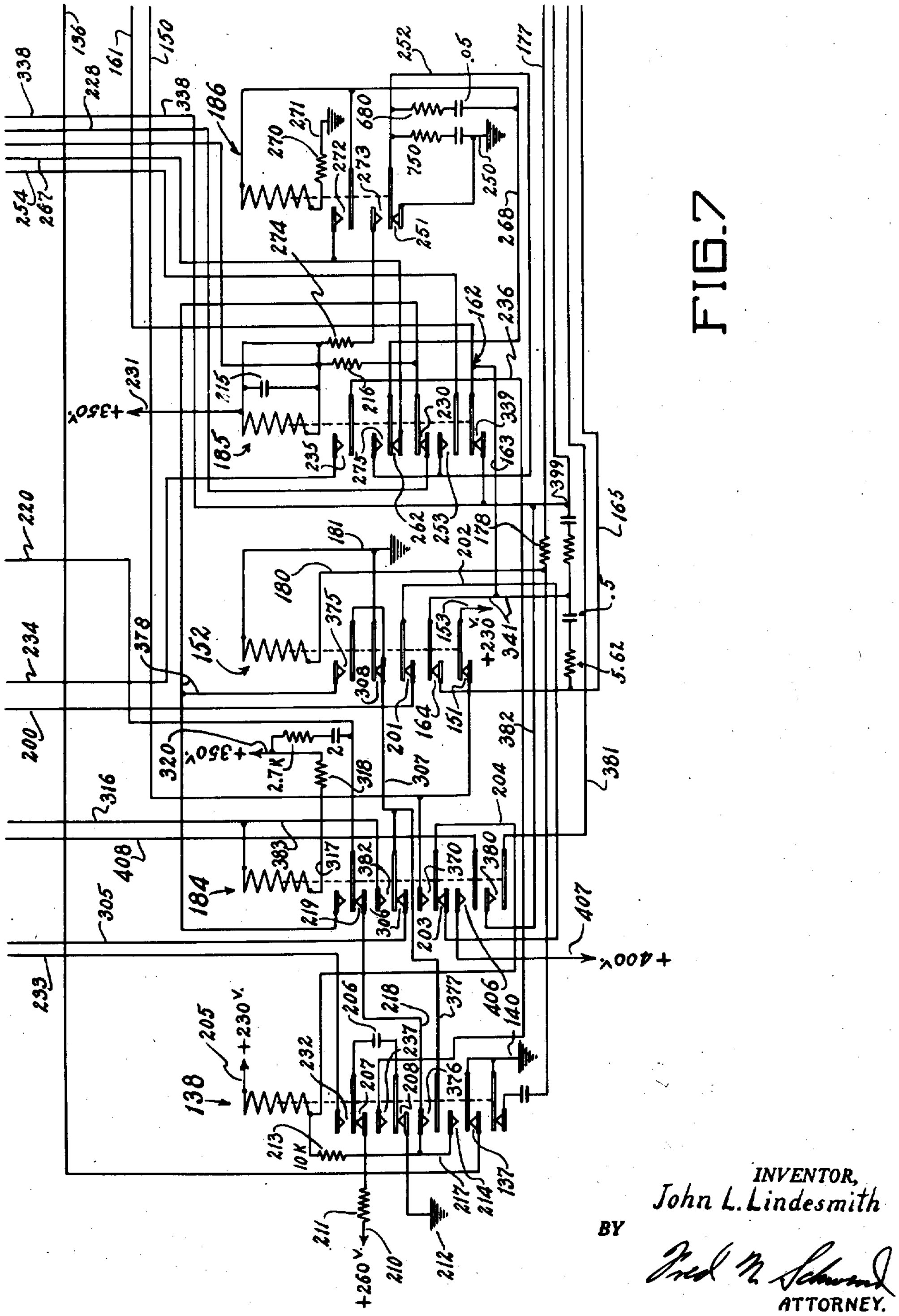
Figure 8:
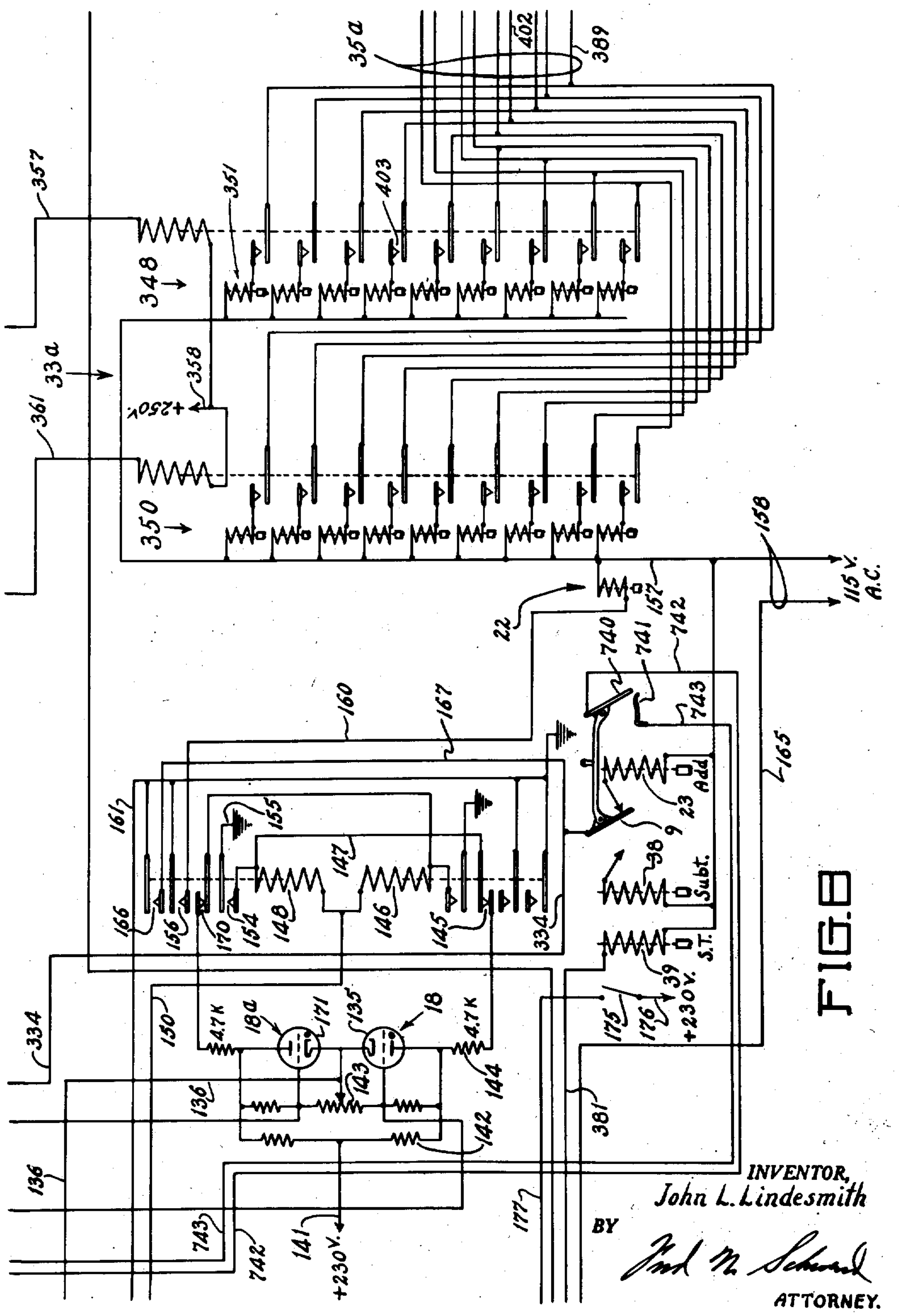

Referring to Figs. 4 and 8 and in particular to the memory unit 18, the conductor 17, connected at its upper end to the cathode of the final counting tube 134 of the counter A, is connected through isolating resistor 139 of 100,000 ohms, resistor 133 of 100,000 ohms, coupling capacitor 149 of .001 mfd. to the igniter of a gaseous tube 135 of the 5823 type. The cathode of the latter tube is normally grounded through a line 136 (see also Fig. 7), normally closed contacts 137 of a trigger relay 138, and ground line 140. The anode of tube 135 is connected to a plus 230 volt supply line 141 through a 47,000 ohm resistor 142. An igniter bias resistor 143 of 470,000 ohms is connected between the cathode and igniter, and the values of the resistors and voltage supply is such as to bias the tube to a point just below the firing point, thereby rendering the latter nonconducting. The anode of tube 135 is also connected in circuit with a 4700 ohm resistor 144, normally closed contacts 145 of a memory relay 146 (associated with the memory unit 18a), line 147, the coil of relay 148 (associated with memory unit 18), line 150 (see also Fig. 7) and normally closed contacts 151 of a machine feed-back relay 152 to a plus 230 volt supply line 153. Therefore, since equal voltage is applied to opposite ends of the coil of relay 148, the latter will normally remain de-energized. However, upon a rise in potential of the cathode of the last counter tube 134 (Fig. 4) of the counter A a positive pulse will be transmitted to the igniter of tube 135, causing the latter to fire and completing a circuit from the top of the coil of relay 148, line 147, now closed contacts 145 of relay 146, resistor 144, tube 135, line 136, contacts 137 of trigger relay 138 to ground line 140, thereby energizing the memory relay 148. Locking contacts 154 now close, connecting the upper end of the relay coil directly to a ground line 155.

Relay contacts 156 now complete a circuit through the solenoid 22 associated with the number 1 key in the hundreds denomination of the machine as follows: line 157 of a 115 volt A. C. supply circuit 158, solenoid 22, line 160, contacts 156 of memory relay 148, line 161 (see also Fig. 7), point 162, line 163, normally closed contacts 164 of the normally de-energized machine feed-back relay 152, and the opposite line 165 of the A. C. supply circuit, thereby energizing the solenoid 22 to set its key.

Concurrently with the establishment of the above circuit, a second circuit is established to the add or subtract solenoids 23 and 38, respectively, of the machine, to effect add or subtract operation thereof, depending on the setting of the switch 9. This circuit which is closed by the contacts 166 of memory relay 148, extends from A. C. supply line 157, add or subtract solenoids 23 and 38, switch 9, line 167, contact 166 and line 161 which it will be recalled is normally connected to the other A. C. supply line 165.

Means are provided to cause the unit "100" to be retained in the memory unit 18a during operation of the machine in response to operation thereof in registering the unit "100" transmitted thereto by the memory unit 18. For this purpose, a normally closed set of contacts 170 are included in memory relay 148. The latter are equal in function to the contacts 145 of memory relay 146. Therefore, these contacts open upon energization of relay 148 to prevent energization of relay 146 upon conduction of the tube 171 associated with the memory unit 18a. Thus the unit 100 will be stored (by conduction of tube 171) until after the current operation of the machine. Thereafter, energization of relay 146 will take place to cause an add or subtract operation of the machine to register the value 100 in a similar manner. It will be noted, on the other hand, that should operation of the machine be effected in response to operation of the memory unit 18a and energization of memory relay 146, the contacts 145 will open, thereby likewise preventing energization of the memory relay 148 as an incident to transmission of a hundreds carry-over pulse from counter A until termination of the current machine cycle.

For the purpose of transmitting the one hundreds carry-over pulse from the counter B to the memory unit 18a, the cathode of the last counter tube 171 (Fig. 6) of counter B is connected through line 27, isolating resistor 172 of 100,000 ohms, resistor 173 of 100,000 ohms, and coupling condenser 174 of .001 mfd. to the igniter of tube 171.

Upon operation of the machine in response to actuation of one or the other of the memory units 18 and 18a, a normally open switch 175 (Figs. 8 and 15) will be closed thereby to complete a circuit through the coil of the machine feed-back relay 152 to energize the latter, thereby opening contacts 151 to open the circuit through whichever one of the relays 146 and 148 has been previously energized. The latter machine feed-back relay circuit is completed from a plus 230 volt supply line 176 through switch 175, line 177 (Figs. 8 and 7), resistor 178 of 10,000 ohms, line 180, coil of machine feed-back relay 152 to ground line 181. Contacts 164 of the latter relay now also open to open the A. C. circuit through the amount key solenoid 22 and through whichever one of the control bar solenoids 23 and 38 have been currently energized.

In the meantime, the conducting memory tube (for example tube 135) will be extinguished by the closing of contacts 154 in the associated relay 148, thereby applying ground potential from ground line 155 through line 147, contact 145 of relay 146 and resistor 144 to the anode of tube 135, so as to drop the anode potential thereof below the cut-off potential.

*Scan circuit*

The scan circuit 33 (Fig. 1) is rendered operative upon operation of the pulse switching circuit 11 (Fig. 2). The scan circuit is effective to sequentially scan all decades of the counters and, through the counter selector circuit 30, to transmit data from the currently inactive counter to the keyboard of the machine 21 through the buffer circuit 34 and the binary-to-decimal conversion matrix 35.

Although the scan circuit actually sequentially scans all four counter decades of the two counters, the order selector circuit 30 is effective to render one or the other counter ineffective by opening the connections to the cathode circuits of the currently active counter.

The scan circuit includes four decade selector relays 179, 189, 182 and 183 (Figs. 3, 4, 5 and 6, respectively) associated with the counter decades 14, 15, 24 and 25, respectively.

The scan circuit further includes the aforementioned trigger relay 138 (Fig. 7), the machine feed-back relay 152, a home relay 184, a self-oscillating pulse generator 185, and a polarity switch relay 186. The latter relays are normally de-energized except during read-out operations.

Operation of the trigger relay 138 is initiated by the counter selector circuit 30 (Fig. 4), the latter being operated in response to operation of the pulse switching circuit 11 of Fig. 1 as will be described in detail hereinafter under the section "Counter Selector Circuit." Suffice it to say at present that the circuit 30 comprises a two-condition relay 30a changeable from either condition to the other upon switching of the pulse train from one of the counters A and B to the other. Located in this relay is a contact armature 188 connected through a resistor 189 of 10,000 ohms to a plus 300 volt supply source 190. A capacitor 191 of .01 mfd. is connected between ground and the armature. Make and break contacts 192 and 193 are alternatively engageable by the contact armature 188 and are connected by line 194 (see also Fig. 3) and capacitor 195 of .001 mfd. to the igniter of a gaseous tube 187, preferably of the type No. 5823. The igniter of this tube is biased to a point somewhat below firing potential by resistors 196 of 1.5 megohms and 197 of 470,000 ohms.

The time constant of resistor 189 and capacitor 191 is of such value that during a switching operation of the pulse switching circuit and consequent change of the relay 30a from one of its conditions to the other, a sufficient charge will be applied on capacitor 191 from the supply source 190 that as one of the contacts 192 and 193 is engaged by armature 188, a positive pulse will be applied to the igniter of tube 187 sufficient to cause firing of the latter. As the latter conducts, a circuit will be completed through the anode circuit thereof, line 200 (see also Figs. 3 and 7) now closed contacts 201 of the machine feed-back relay 152, line 202, now closed contacts 203 of the home relay 184, line 204, and e coil of trigger relay 138 to a plus 230 volt supply ıe 205, thereby energizing the trigger relay.

The trigger relay includes a 2 mfd. condenser 206 ıich, when the relay is in its illustrated normal de-ergized condition, is connected, on opposite sides there-', through break contacts 207 and 208 to a plus 260 ılt supply line 210, a 10,000 ohm resistor 211, and to ground line 212, respectively.

Upon energization of the trigger relay, a locking cir-ıit will be closed thereby comprising a 10,000 ohm re-ıtor 213 connected between the bottom of the relay ıil, line 217, now closed relay contacts 214 and ground ıe 140. The anode circuit of the tube 187 will thus : effectively grounded to cause the latter to become ın-conductive. The trigger relay will remain ener-zed throughout the scanning operation and will be de-ıergized upon completion of the subtotal operation of e machine as will appear hereinafter.

Energization of the trigger relay 138 initiates continued ılsing of the pulse relay 185 at a repetition rate con-olled by a condenser 215 of 6 mfd. connected across e coil of the latter and a resistor 216 of 15,000 ohms. ır this purpose, contacts 214 of the trigger relay com-ete a circuit from ground line 140, through line 217, ıe 218, now closed contacts 219 of the home relay 184, ıe 220 (see also Fig. 3), point 221, line 222 (see also ıg. 4), now closed contacts 223 of decade selector relay ı9, line 224, point 225, line 226 (see also Figs. 5 and 6) ıw closed contacts 227 of the decade selector relay 183, ıe 228, normally closed contacts 230 of the pulse relay ı5 (Fig. 7), resistor 216, and the coil of the pulse relay · a plus 350 volt supply line 231.

As the pulse relay 185 initially closes its contacts, a rcuit will be completed from the now charged con-ınser 206 (Fig. 7) to the first decade selector relay 180 ı energize the latter. This circuit is as follows: the ıper side of condenser 206, now closed trigger relay ıntacts 232, line 233 (Figs. 7 and 3) coil of decade ılector relay 179, line 234, now closed contacts 235 of ıe pulse relay, line 236 and now closed contacts 237 ı the lower side of condenser 206. The value of the ındenser 206 is such that substantially its entire charge ill be dissipated in energizing the coil of relay 179 ıring the above operation so that it will be ineffective ıereafter to again energize the latter relay during the ırrent scanning operation.

As the decade selector relay 179 closes, locking con-ıcts 238 thereof establish a circuit from the now rounded point 221, line 234, coil of relay 179, line 240, nd now closed contacts 241 of selector relay 189 to a lus 350 volt supply conductor 242.

Figures 9, 10:
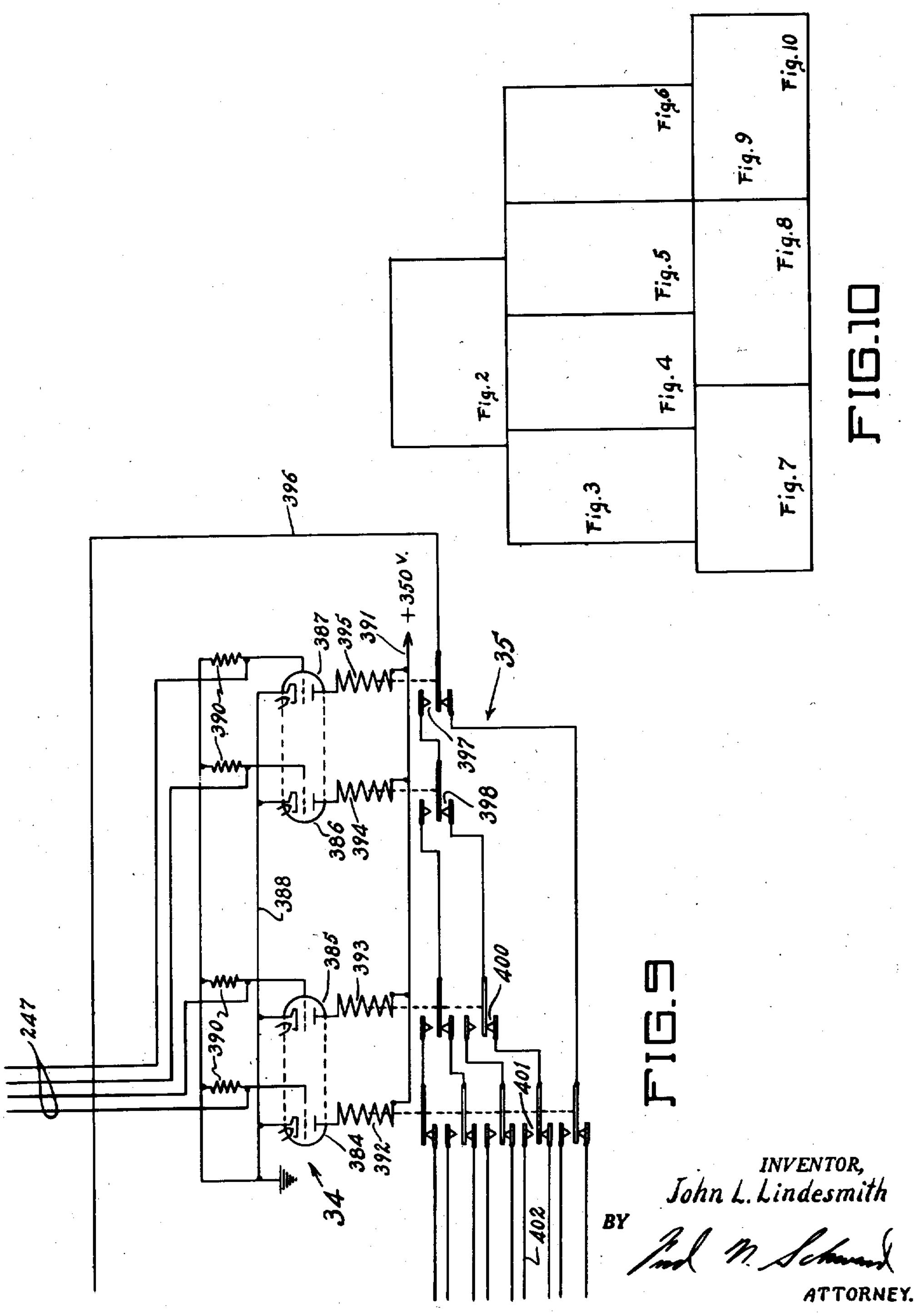
Figure 11:
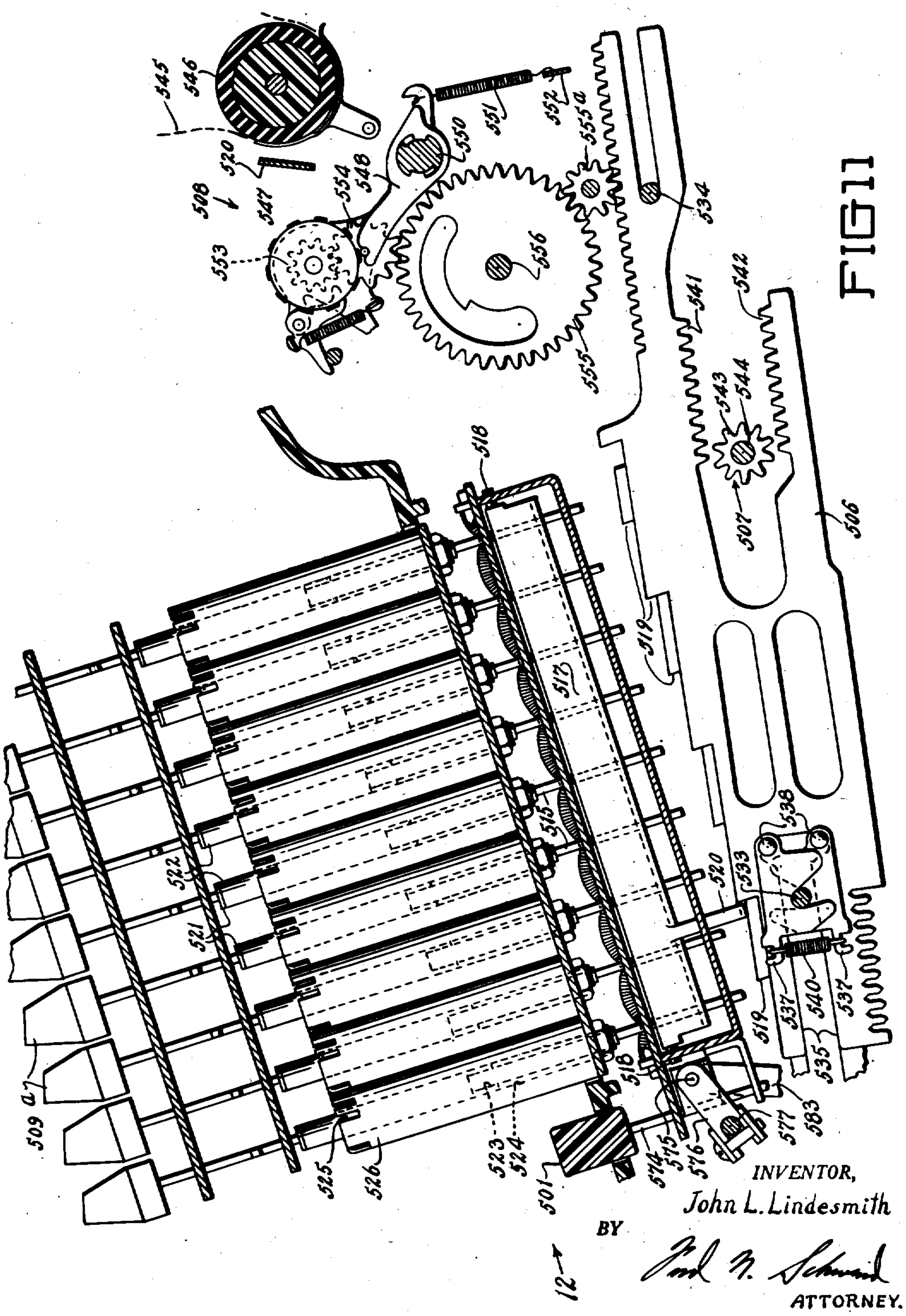
Fig. 11 is a longitudinal sectional view through the mechanical computing and recording machine and is taken substantially along the line 11—11 of Fig. 12.

It will thus be seen that the cathodes of the various ıunting tubes 104 to 107 in the counter decade 14 will e connected through contacts 243 to 246, inclusive, of ılay 179 to the aforementioned data trunk lines 31 and ' at this moment the counter selector relay 30 (Fig. 4) ere in its illustrated de-energized condition, the data nes 31 would be connected through data trunk lines 247 ı the buffer circuit 34 (Fig. 9) to set an appropriate ecimal amount key in the appropriate (units) denomi-ational order of the machine keyboard.

Bearing in mind that at this time the polarity switch ılay 186 (Fig. 7) is de-energized, a circuit will be ap-lied from ground line 250, through now closed polarity vitch contacts 251, line 252, now closed pulse relay con-ıcts 253, line 254 to a pulse supply line 255 (Figs. 3, , 5 and 6) to make contacts, like contact 256 of decade ılector 179, in all of the decade selector relays. Since ıake contacts 256 are at this moment the only ones of ıis type closed, ground potential will be applied through ıese contacts, line 257, the coil of the second decade ılector relay 189, line 258, now closed break contacts 60 of decade selector relay 182, line 261, to the now rounded line 222. Consequently, the decade selector ılay 189 will not at this time become energized.

As the pulse relay 185 drops, a circuit is completed by break contacts 230 thereof as follows: plus supply line 263 (Fig. 3), now closed contacts 264 of relay 179, line 265, point 266, line 267, contacts 262 of pulse relay 185, line 268, coil of polarity switch relay 186, and resistor 270 of 10,000 ohms to ground line 271, thereby energizing the polarity switch relay. Locking contacts 272 now lock the polarity switch relay in energized condition, completing a circuit from line 268 to line 267 which, it will be recalled, is now connected to point 266, line 265 and contacts 264 of decade selector relay 179 to the plus supply line 263. Also, make contacts 273 of the polarity switch relay 186 now close, applying a positive potential from the supply line 231, through a 1,000 ohm resistor 274 and line 252 to the now open make contact 253 of the pulse generator.

As the pulse generator becomes energized the second time, it will become effective to energize the second decade selector relay 189 and de-energize decade selector relay 179 as follows: pulse generator make contacts 253 close, completing a circuit from the line 252 through line 254, pulse supply line 255, now closed contacts 256 of selector relay 179, line 257, coil of decade selector relay 189, line 259, now closed break contacts 260 of relay 182, line 261 to line 222 which it will be recalled, is connected to ground through point 221, line 220 (see also Fig. 7), now closed home relay contacts 219, line 218, line 217, and now closed contacts 214 to ground line 140, thereby energizing selector relay 189. The break contacts 241 of relay 189 now open, thereby breaking the locking circuit for relay 179 and thereby allowing the latter to drop.

It is necessary to maintain the polarity switch relay 186 energized during the second energization of the pulse relay 185, and since the former would otherwise become de-energized by virtue of the opening of make contacts 264 of the decade selector relay 179, a new circuit is completed through the polarity switch relay as follows: make contacts 275 of the pulse relay 185 complete a circuit from ground line 271, resistor 270, coil of polarity switch relay 186, line 268, contacts 275, line 252, now closed contacts 273, and resistor 274 to the plus supply line 231.

In order to lock the decade selector relay 189 in energized condition, locking contacts 280 thereof complete a circuit from plus supply line 242, through the coil of this relay, line 258, now closed contacts 260 of decade selector relay 182 and line 261, which it will be recalled is connected to the now grounded line 222.

Accordingly, the cathodes of the counting tubes in the second counter decade 15 will be connected to the data line trunk 31 through contacts 285 to 288, inclusive. It will be noted that the selector relay 189 has no provision for applying positive potential to the polarity switch control line 265. Therefore, the only means now effective to retain the polarity switch relay in energized condition is a circuit established from supply line 231, resistor 274, contacts 273, line 252, pulse relay contacts 275, line 268 and the coil of polarity switch relay 186 to ground line 271.

The decade selecting relay 189 upon energizing closes make contacts 290 to establish a new circuit from plus supply line 291 (Fig. 6) through now closed contacts 292 of decade selector relay 183, line 293, coil of selector relay 182, lines 294, 295 and contacts 290 to the pulse supply line 255, thereby requiring ground potential to be applied to the latter by the polarity switch relay 186 in order to energize relay 182.

As the pulse relay 185 drops the second time, its make contacts 275 break the energizing circuit through the polarity switch relay 186, allowing the latter to drop and causing its break contacts 251 to apply ground through line 252 to the now open contacts 253 of the pulse relay 185. Although at this time the break contacts 262 of the pulse relay 185 establish a circuit from the polarity switch control line 265 through lines 267 and 268 to the polarity switch relay, no other connection is now existent to the plus supply, and therefore the polarity switch relay will remain de-energized.

Upon the third energization of the pulse relay 185, its make contacts 253 will apply ground potential from the now-closed polarity switch contact 251 through line 252, contacts 253, line 254, the pulse supply line 255, now closed contacts 290 of the decade selector relay 189, line 295, coil of decade selector relay 182, line 293, now closed contacts 292 of the selector relay 183 to the plus supply line 291, thereby energizing the decade selector relay 182.

Accordingly, the upper four contacts 296–299, inclusive, of the selector relay 182 will now connect the cathodes of the four counting tubes in the counting decade 24 to the data line trunk 32. Holding contacts 300 of the relay 182 now close, completing a circuit through the coil of this relay through line 261 to the now grounded line 222. Also, as the break contacts 260 of relay 182 now open, the circuit through the selector relay 189 will be opened to de-energize the latter.

It will be noted that the relay 182 will, through its make contacts 301, apply positive potential from a 350 volt supply line 302 to polarity switch control line 265 in the same manner as did the contacts 264 of the first decade selector relay 179. Therefore, as the pulse relay 185 drops the third time, a positive potential will be applied through its break contacts 262 and line 268 to the coil of the polarity switch relay 186, thereby energizing the latter. Locking contacts 272 now establish a holding circuit for the polarity switch relay and make contacts 273 now apply a positive potential from plus supply line 231 through resistor 274, contacts 273, and line 252 to the now open make contacts 253 of the pulse relay.

As the pulse relay 185 energizes the fourth time, it will complete the circuit from line 252 which, it will be recalled, has positive potential applied thereto, through its contacts 253, line 254, pulse supply line 255, line 239, now closed contacts 303 of the selector relay 182, line 304, the coil of the last decade selector relay 183, line 305, now closed contacts 306 of the home relay 184, line 307, now closed contacts 308 of the machine feed-back relay 152 to ground line 181, thereby energizing the selector relay 183. Locking contacts 310 now close to establish a holding circuit from the plus supply line 291 through the coil of the selector relay 183 to maintain the latter energized. At this time also the break contacts 292 open to de-energize selector relay 182, leaving only the relay 183 energized.

Accordingly, contacts 311 to 314, inclusive, of relay 183 now connect the cathodes of the four counting tubes in counter decade 25 to the data line trunk 32.

Since positive potential is now removed from the polarity switch control line 265, the polarity switch relay 186 will drop out.

Upon the fifth energization of pulse relay 185, its make contacts 253 will now apply ground potential from line 252 (which it will be noted is now connected through break contacts 251 to ground line 250), through line 254, pulse supply line 255, lines 239 and 249, to now closed make contacts 315 of selector relay 183, line 316, the coil of home relay 184, line 317, resistor 318 of 10,000 ohms, to a plus 350 volt supply conductor 320, thereby energizing the home relay.

As will be noted hereinafter, the home relay, upon energizing, causes a subtotalling operation of the machine to complete the read-out operation, but this subtotalling operation will be held up until completion of a current machine cycle.

The aforementioned relay circuit, including decade selector relays 179, 189, 182 and 183, pulse generator 185 and polarity switch relay 185, for sequentially scanning the different counter decades, is disclosed and claimed in the copending application of R. E. Loudon, Serial No. 278,516, filed March 25, 1952, now Patent No. 2,719,938.

COUNTER SELECTOR CIRCUIT

The counter selector circuit 30 comprising selector relay 30a (Fig. 4) is provided to selectively effect a read-out operation from the currently inactive one of the counters A and B. The relay 30a is illustrated as de-energized and in this condition its break contacts 321 to 324, inclusive, directly connect the data trunk lines 31 with respective lines of data line trunk 247. However, upon energization of the relay, its make contacts 325, to 328, inclusive, will connect the data trunk lines 32 to respective ones of the data trunk lines 247.

For the purpose of energizing relay 30a, the coil of the latter is connected in circuit with a plus 350 volt supply source 330 and through line 331 (Figs. 2, 3 and 4) to the anode of a tube 332 comprising the aforementioned buffer circuit 29. The latter tube is preferably one-half of a 12AU7 type tube and the cathode thereof is directly connected to ground line 41. The grid of tube 332 is connected to point 333 in circuit with the lower control grid of the aforementioned gating tube 54. Consequently, as the trigger stage 37 is flipped to cause conduction of the left-hand side of its duotriode tube, the consequent rise in potential at point 333 will cause conduction of tube 332 to thereby energize the relay 30a as an incident to reception of a read-out pulse over the line 710.

Means are provided under control of the counter selector relay 30a to effect either an add or a subtract machine operation, depending upon the setting of the switch 9 (Fig. 8), either following a scanning operation of counter A, or a scanning operation of counter B by the scan circuit, depending upon which counter is currently inactive. For this purpose, break contacts 329 of the selector relay normally connect the switch 9 through line 334 and line 335 to the normally open make contacts 336 of the decade selector relay 189 associated with the second decade 15 of counter A.

In cases where the selector relay remains in its de-energized condition, e. e., where the read-out operation is being performed on counter decades 14 and 15 of counter A, the second scanning cycle, upon energizing decade selector relay 189 will cause its contacts 336 to complete the circuit from line 335 through lines 337, point 346, line 333 (see also Fig. 7), contacts 339 of pulse relay 185 (when the latter becomes de-energized), point 162, line 163, line 341 and now closed contacts 164 of the machine feed-back relay to the line 165 of the A. C. supply circuit 158, thereby energizing one or the other of the add or subtract solenoids 23 and 38 to cause operation of the machine, entering the amount appearing on data line trunk 247 into the machine in the manner to be described.

The circuit is illustrated in the condition wherein counter B, i. e., decades 24 and 25, are currently active to accumulate count pulses over line 13. Therefore, at this time the trigger stage 37 is so flipped that its right-hand triode is conductive and its left-hand triode nonconductive to cause conduction of the left-hand gate tube 53 upon reception of count pulses. Thus, the point 333 will currently be at a low potential maintaining the buffer tube 332 nonconducting to hold the counter selector relay 30a in its illustrated non-energized condition.

Upon reception of a read-out signal pulse, trigger 37 will be flipped, rendering counter A active and counter B inactive to receive pulses. Thus, point 333 will be raised in potential to cause conduction of tube 332 and energization of relay 30a. Consequently, decades 24 and 25 will be connected through counter selector relay contacts 325—328 to the data line trunk 247.

Now, relay contacts 342 of relay 30a close, conditioning a circuit from the line 334 (see also Fig. 8), line 343 (see also Figs. 5 and 6) to make contacts 344 of the decade selector relay 183. During the fourth scan cycle, i. e., upon energization of the relay 183, the contacts 344 thereof will complete the circuit from the above-noted line 343, line 338 (Figs. 4–7), contacts 339 of pulse relay 185 (Fig. 7), line 163, line 341 and contacts 164 of relay 152, to the line 165 of the A. C. supply circuit 158 to energize one or the other of the add or subtract control solenoids.

The counter selector relay **30*a* is also effective to direct information from the various counter decades through a units order selector relay 348 (Fig. 8) and a tens order selector relay 350, depending upon which counter is currently inactive. The order selector relays 348 and 350 comprise the order selection circuit 33*a* (see also Fig. 1). The order selector relays are arranged to connect the nine decimal digit lines of trunk 35*a* to the units or tens denominational group of amount key solenoids, one of which is indicated at 351, depending upon the particular counter being currently scanned. For the above purpose, break contacts 352 of the counter selector relay 30*a* normally condition a circuit from ground line 353 through line 354 (see also Fig. 3) to make contacts 355 of the first decade selector relay 179. Therefore, in cases where a read-out operation is being performed on counter A, the contacts 355 thereof will complete a circuit from the now grounded line 356 (Figs 3, 4 and 5), line 357 (Figs. 5 and 8), the coil of the units denominational order selector relay 348 to a plus 250 volt supply source 358, thereby energizing the latter relay and connecting the digit lines of trunk 35*a* to the associated amount key solenoids, like 351** in the units denominational order of the machine keyboard.

Now, as the second decade selector 189 is subsequently energized, make contacts 360 thereof complete a circuit from the now grounded line 354 through line 361 (see also Figs. 5 and 8) and the coil of the tens denominational order selector relay 350 to the plus supply source 358, thereby energizing the latter relay to connect the digit lines of trunk **35*a*** to respective ones of the amount key solenoids in the tens denominational order of the machine keyboard.

In cases where the counter B is inactive and a read-out operation is being performed thereon the counter selector relay **30*a* will, as mentioned before, be energized, and make contacts 363 will now condition a circuit from the ground line 353, through line 364 and lines 365 (Fig. 5) and 366 (Fig. 6) to make contacts 367 and 368 of the counter decades 24 and 25, respectively, of counter B. Thus, as the decade selector relay 182 becomes energized, the contacts 367 thereof complete the aforementioned circuit through line 357 to energize the units denominational order selector relay 348. Likewise, as the decade selector relay 183 becomes energized, its contacts 368 will complete the circuit through lines 371, point 372 and line 361 to energize the tens denominational order selector relay 350**.

It was previously noted that the pulse relay 185 is self-oscillating at a rate determined by the R. C. circuit comprising condenser 215 and resistor 216. However, operation of the pulse relay is suspended during operation of the machine 21 during the process of adding or subtracting items read out of one or the other of the counters A and B.

It will be recalled that the machine feed-back relay 152 of Fig. 7 is energized during operation of the machine by the closing of switch 175 (Fig. 8). Accordingly, make contacts 375 of the relay 152 close, completing the following circuit: ground line 140, now closed contacts 214 of relay 138, now closed contacts 376 of relay 138, line 377, line 307, contacts 375 of relay 152, line 378, resistor 216, the coil of pulse generator, thereby maintaining the pulse relay energized throughout the machine operation.

Upon completion of a machine operation as an incident to scanning of either counter, the home relay 184 will be energized as noted hereinbefore. As soon as the machine feed-back relay 152 de-energizes following an add or subtract operation of the machine, and as soon as the pulse relay 185 again deenergizes, a circuit is completed through the subtotal solenoid 39 (see also Fig. 8) of the machine. This circuit is completed as follows: from A. C. supply line 157, solenoid 39, line 381 (Figs. 7 and 8), now closed contacts 380 of the home relay 184, line 382, contacts 339, pulse relay 185, point 162, line 163, line 341, now closed contacts 164 of the machine feed-back relay 152, and A. C. supply line 165.

In the meantime, a locking circuit is completed for the home relay 184 comprising its make contacts 382 which ground the upper end of the relay through a circuit comprising line 383, contacts 382, line 377, now closed contacts 376 and 214 of trigger relay 138 to ground line 140.

Now, as the machine completes its current cycle in effecting a subtotal operation, the machine feed-back relay 152 de-energizes, causing its contacts 151 to apply positive potential from the plus supply source 153 through now closed contacts 370 of the home relay and line 204 to the bottom of the trigger relay coil, thus allowing the latter to de-energize. As the contacts 214 and 376 of the latter relay open, the holding circuit for the home relay is opened and consequenly all of the scan control relays, i. e., 138, 152, 184, 185 and 186 become de-energized.

*Binary-to-decimal conversion matrix*

As described hereinbefore, the conversion matrix 35 (Figs. 1 and 9) is effective to translate a value in binary form transmitted over data trunk 247 into a decimal value by completing a circuit through a corresponding decimal line of the nine line trunk **35*a*. Thus, a corresponding amount is set up on one of the amount keys in the units or tens denominational order of the machine, depending upon the particular order selector relay 348 or 350** which has been energized by the scanning circuit.

The four lines of the data trunk 247 are connected to the igniters of respective ones of a set of four buffer triodes 384 to 387. The latter preferably form the respective halves of two 12AU7 type tubes.

The cathode circuits of the latter buffer triodes are connected directly to a ground line 388 while the grids thereof are normally biased by respective grid resistors 390 to effect conduction of the respective tubes.

The anodes of the various triodes 384 to 387 are connected to a plus 350 volt supply conductor 391 through the coils of matrix relays 392 to 395, inclusive. Thus, the matrix relays 392 to 395 are normally energized, but one or more become de-energized during a read-out operation of each decade of an inactive counter, depending upon the number of counter tubes which are held in nonconducting condition in a particular counter decade.

The matrix relays include varying numbers of double throw or single throw switch contacts effective in different combinations to convert a value represented in a binary form by the various relays to a decimal amount by connecting a common line 396 to one of the nine trunk lines of trunk **35*a*. Thus, a circuit is completed through the A. C. supply line 157, a selected solenoid, like solenoid 351 in the units or tens denominational order of the machine, through the selected line like line 389 of trunk 35*a*, line 396 (see also Figs. 7 and 8), point 399, contacts 339 of relay 185, point 162, line 163, line 341, contacts 164 of relay 152 and the second A. C. supply line 165**.

Considering an example of the operation of the binary-to-decimal matrix, assume that a binary "0110" condition exists in the counter decade 14 resulting in the counting tubes 105 and 106 being rendered nonconducting and the remaining tubes 104 and 107 conducting. Accordingly, buffer tubes 385 and 386 will be rendered nonconductive, and de-energize the matrix relays 393 and 394. In such case, a circuit will be completed from line 396 through now closed make contacts 397 of relay 395, break contacts 398 of relay 394, break contacts 400 of relay 393, make contacts 401 of relay 392 and line 402 to the make contacts 403 of the units denominational order selector relay 348, thereby energizing the key solenoid for the "6" key in the units order of the machine.

As noted hereinbefore, it is possible to change the circuit arrangement from additive to subtractive entries and vice versa by throwing the switch 9 (Figs. 1 and 8) from one setting to another. This may be done at any time. However, it is desirable to effect a read-out operation of the currently active counter as an incident to such a change-over in order to avoid an erroneous accumulation of add and subtract amounts in one counter. For this purpose, the switch 9 (Fig. 8) is provided with a wiper blade 740. As the switch is thrown from one position to the other, the blade 740 wipes across a contact element 741. The latter elements are connected by lines 742 and 743, respectively (see also Fig. 2 and 4), to opposite sides of the switch 10 and thus become effective during a throw-over operation of the switch 9 to energize the read relay 702 and effect a read-out operation.

*Counter reset circuits*

The counters A and B have their anode supply conductors 111 and 405, respectively, connected to separate 200 volt power supply circuits (not shown). In order to reset these counters to zero, i. e., with all counter tubes in conducting condition, a 400 volt power supply is momentarily connected to the anode supply line of the currently inactive counter during the subtotalling operation. For this purpose, energization of the home relay 184 (Fig. 7) incident to effecting a subtotalling operation of the machine will cause its make contacts 406 to complete a circuit from a 400 volt supply source 407, through line 408 (see also Figs. 3 and 4) and through one or the other of contacts 410 and 411, depending upon the condition of the counter selector relay 30*a*, thus applying relatively high potential through one or the other of lines 412 and 413 (see also Figs. 3 and 5, respectively) to the anode supply line 111 or 405 of the currently inactive counter, i. e., the counter on which a read-out operation is being performed.

COMPUTING MACHINE

The computing machine, generally indicated at 21 in Fig. 1 and illustrated in Figs. 11 to 15 is basically similar to that found in the well known Clary adding machine disclosed in the patent to R. E. Boyden, No. 2,583,810, issued on January 29, 1952. The particular accumulating mechanism found in this machine is disclosed in the patent to E. P. Drake, No. 2,472,696, issued on June 7, 1949.

Since the basic structure of the Clary machine is disclosed in the above patents, only those portions thereof which relate to the present invention will be disclosed in detail, and reference is hereby made to said patents for a disclosure of the basic machine. However, it is to be understood that the invention is not limited to the particular machine disclosed.

The machine includes a series of denominational banks or orders of amount keys 500 on which amounts to be entered in the machine may be set. In addition to the amount keys, a series of depressible control bars is provided, including an add bar 501, a subtract bar 502, a nonadd bar 503, a subtotal bar 504, and a total bar 505. The latter bars are effective upon depression to cause operation of the machine to perform the respective functions controlled by the bars. Also, as was noted hereinbefore, the add, subtract and subtotal bars are provided with solenoids located in the general control circuit whereby they may be automatically depressed during operation of the system in response to a read-out command signal initiated, for example, by the switch 10 (Figs. 1 and 2).

*Keyboard*

Each of the amount keys 500, when depressed, serves as a limit to differentially control the extent of movement of an aligned drive rack 506 to drive an accumulator, generally indicated at 507, to enter a value therein corresponding to the value of the depressed key and to also register a printing mechanism, generally indicated at 508, so as to print the registered value.

Each of the keys 500 comprises a key top 509 of plastic and a key stem 510 guided in aligned slots formed in a pair of spaced guide plates 511 rigidly supported on the frame of the machine in a manner not shown.

Figure 12:
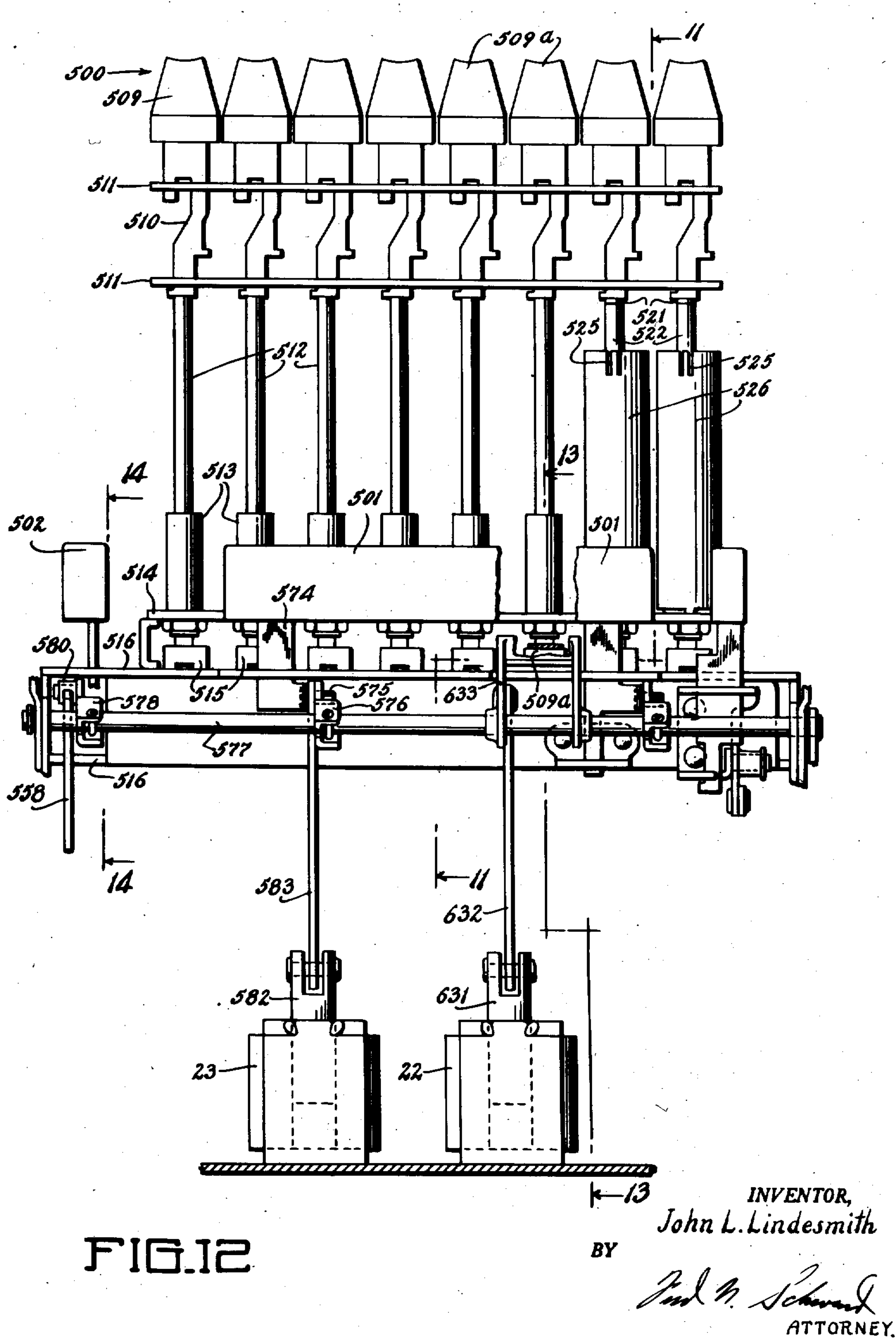
Fig. 12 is a front view of the machine taken in the direction of the arrow 12 of Fig. 11.

In all but the two lowermost amount key orders, i. e., the two banks of keys to the right as shown in Fig. 12, the key stems 510 rest on rods 512 which are guided in bushings 513 carried by a plate 514 suitably secured to the machine framework. The rods 513 rest on sub key stems 515 guided in aligned slots in a second pair of key support plates 516. The latter plates are also suitably secured (in a manner not shown) to the machine framework.

Spring means 539 are provided to individually urge the sub key stems 515 and consequently the amount keys, into their upper illustrated positions, wherein they are ineffective to limit movement of the aligned racks. However, means are provided for locking the key stems in depressed position. For this purpose each sub key stem 515 is provided with a cam lobe (not shown) formed thereon which, when the key is depressed, rocks a locking bail 517 pivoted at either end thereof by trunnion bearings 518. At the bottom of a key stroke, the cam lobe on the respective sub key stem passes below the bail 517, enabling the latter to retract partially under the urge of a spring (not shown) to a position where it latches the key stem depressed in the path of an associated shoulder 519 on the aligned rack. The various shoulders 519 are so spaced relative to their sub key stems 515 that the rack will be advanced a number of increments equal to the value of the depressed key before being arrested.

A zero block 520 is formed on the locking bail 517 and when no amount key in the associated order is depressed, the bail 517 will be held in an extreme inwardly rocked position wherein the zero block 520 will be positioned directly in front of one of the shoulders 519, thereby preventing any substantial movement during the subsequent operation of the machine. However, when any key in that order is depressed, the bail 517 will be held outward sufficiently to maintain the zero block 520 out of the path of the rack.

In the two lowermost denominational orders, the key stems 510 rest on nonferrous caps 521 (Fig. 12) secured to armature 522 of ferrous metal. Plungers 523 are interposed between the armatures 522 and the sub key stems 516 and are guided by bushings 524 also secured to the support plates 514. The armatures 522 are slidably mounted in the cores of solenoids 525 enclosed in ferrous metal containers 526 secured to the plate 514. The various windings of the latter solenoids are located in the general circuit shown in Fig. 8.

Figures 13, 14:
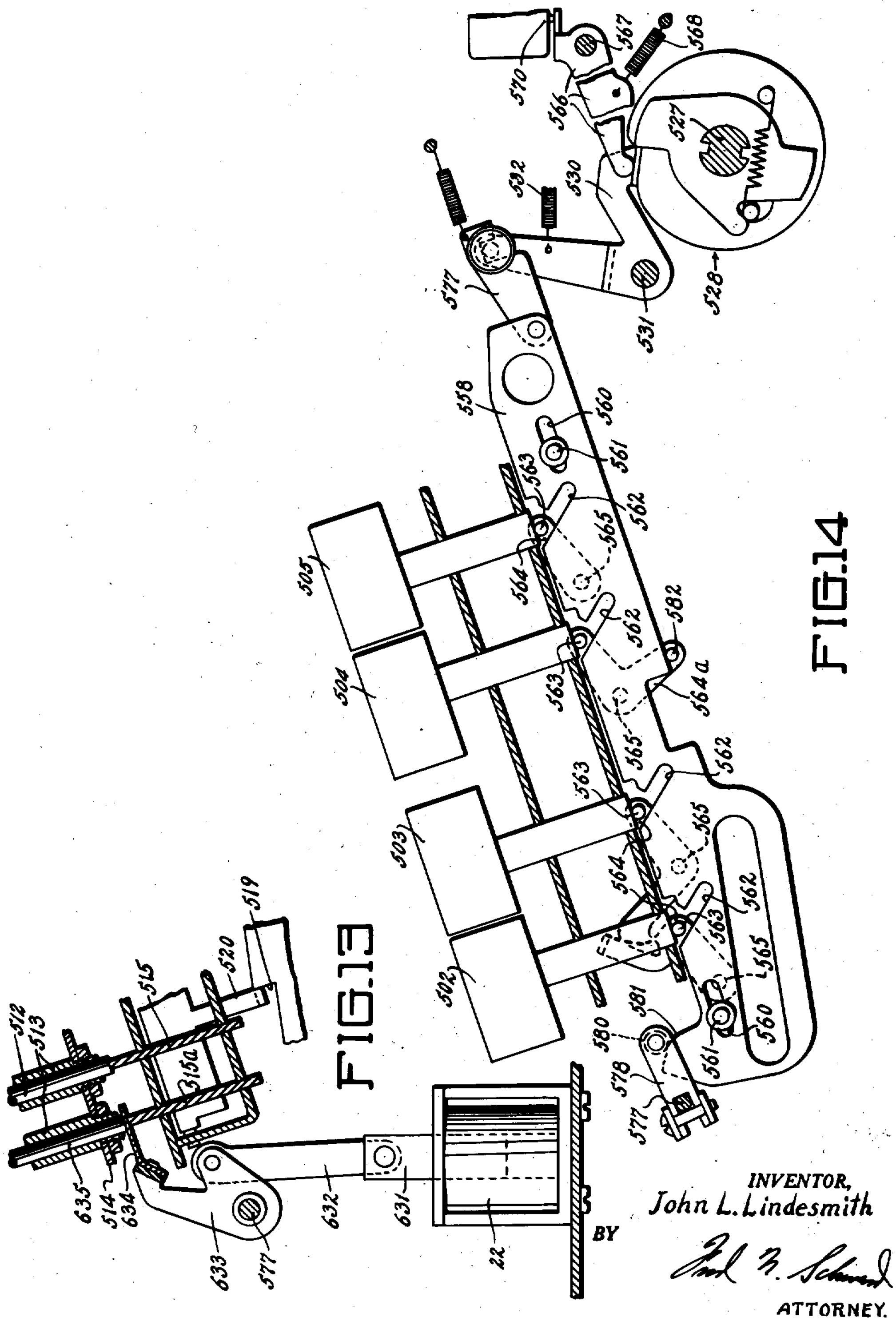
Fig. 13 is a sectional view illustrating the solenoid and linkage for depressing the "one" amount key in the hundreds denominational order of the machine, and is taken substantially along the line 13—13 of Fig. 12.
Fig. 14 is a sectional elevational view showing the machine clutch controls, and is taken substantially along the line 14—14 of Fig. 12.
Figure 15:
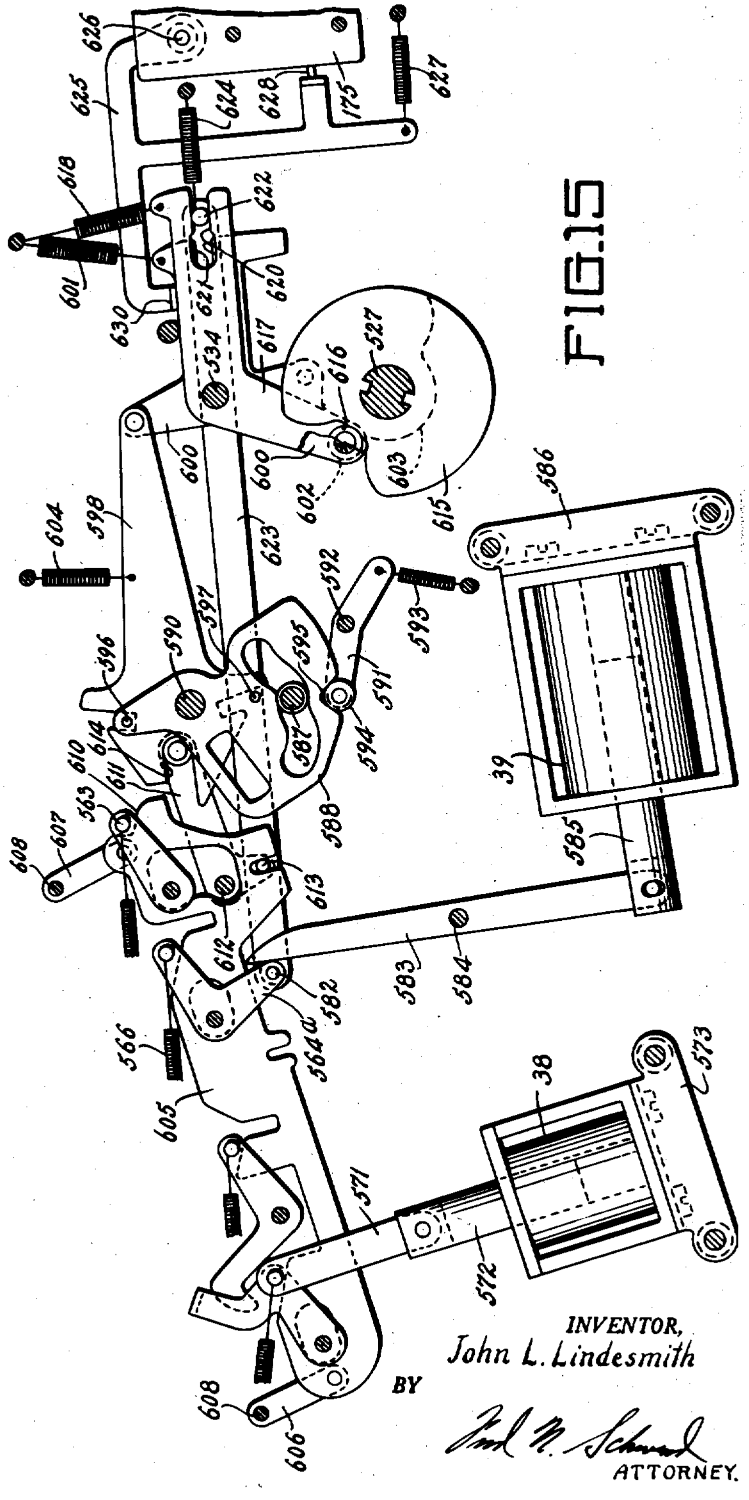
Fig. 15 is a sectional elevational view illustrating the accumulator positioning controls.

Referring to Figs. 14 and 15, the machine is driven by a main drive shaft 527 through a cyclically operable clutch, generally indicated at 528, the driven side of the latter being connected to a suitable electric motor (not shown).

The clutch 528 is controlled by a clutch dog 530 pivoted at 531 and normally urged by a spring 532 into its illustrated position where it maintains the clutch 528 in disengaged condition.

Means (not shown) are provided for yieldably transmitting a drive from the drive shaft 527 to the various racks 506 so as to advance the latter until arrested by depressed ones of the amount keys in those orders where a key has been depressed, or by the zero block 520 of those orders where a key has not been depressed.

The racks are guided for fore and aft movement by shafts 533 and 534 embraced by guide slots 535 and 536, respectively.

The shaft 534 is fixedly mounted in the framework of the machine, but the forward shaft 533 is moved fore and aft of the machine by the drive shaft 527 through the aforenoted drive means. The shaft 533 is yieldably connected to each rack by pairs of opposed drive elements 537 pivotally mounted on the shaft and having rollers 538 engaging notches formed at the closed end of the slots 535. A spring 540 urges the elements 537 outwardly to normally maintain the rollers 538 in driving engagement with the notches until the respective rack is arrested by the zero block or amount key stems.

Each rack 506 is provided with a pair of rack gear sections 541 and 542 located on opposite sides of ordinally arranged accumulator gears 543 forming part of the accumulator 507, the gears 543 being independently and rotatably mounted on an accumulator shaft 544.

During additive or subtractive operations the accumulator will be raised or lowered respectively into mesh with the associated rack gear sections so that the rack gears will be rotated in the appropriate direction during forward movement of the racks, while during return movement of the racks the accumulator will be held in its neutral illustrated position whereby to retain the amount entered therein.

During totalling operations the accumulator gears will be held in mesh with the lower rack gear sections 542 during forward movement of the racks, while during subtotalling operations the accumulator gears will be held in mesh with the lower rack gear sections 542 during both forward and return movement of the racks.

PRINTER

The various values registered on the racks 506 are printed on a paper tape 545 which is guided over a platen 546 past a printing point where such values are printed thereon.

The printer comprises a series of type wheels 547 associated with respective ones of the rack 506. Each type wheel has a series of type characters spaced therearound and ranging in value from 0 to 9. These wheels are so entrained with associated ones of the rack 506 that they will print a digit corresponding to the value of the key depressed in the associated order or to the numerical position to which the associated rack is advanced.

Each type wheel is rotatably mounted on a separate lever 548 loosely keyed on a printer control shaft 550 and urged clockwise by an individual spring 551 tensioned between the lever and a part 552 of the machine frame. A gear 553 fixed to each type wheel 547 is maintained in mesh with a gear 554 also rotatably mounted on the associated lever 548. Normally, except during a printing operation, the levers 548 are held in their positions shown in Fig. 11 by the shaft 550 wherein each gear 554 is held in mesh with one of a series of aligned idlers 555 independently and rotatably mounted on a stationary shaft 556. The idlers 555 are entrained with their respective racks 506 through pinion assemblies, one of which is illustrated at 555*a*.

During the printing phase of a machine cycle, the racks 506 will be located in advanced positions limited by depressed ones of the amount keys, and at this time the printer control shaft will be rocked clockwise, allowing springs 551 to rock the various levers 548 to carry the type wheel 547 into contact with a printing ribbon 520, whereby to print the value registered on the wheel onto the tape 545.

*Machine control*

Means are provided whereby depression of any of the machine control bars 501 to 505 either manually or automatically under control of the circuitry of the computing system, will cause engagement of the main clutch 528 (Fig. 14) and operation of the machine. For this purpose the clutch control dog 530 is connected by a coupling element 557 to a clutch control bar 558. The latter is provided with elongated slots 560 which embrace stationary frame studs 561 for guiding the control bar fore and aft of the machine. Four inclined cam slots 562 are formed in the control bar 558 and each underlies a pin 563 carried by an arm 564 pivoted on a frame pin 565. Each arm is urged upwardly by a tension spring 566 (Fig. 15) to normally maintain the associated control bars (502 to 505) in their illustrated raised position, the stems of the latter resting on the pins 563. It will thus be seen that depression of any of the control bars 502, 503, 504 or 505 will cam the clutch control bar 558 forwardly to rock the clutch control dog 530 counterclockwise and thus effect engagement of the main clutch.

The clutch control dog is connected to a switch control lever 566 pivoted at 567. The lever 566 is normally held by a tension spring 568 in a position to break the contacts of a motor control switch 570 located in the power circuit of the drive motor (not shown). Thus, as the clutch dog 530 is rocked to effect engagement of the clutch, it will rock the switch control lever 566 against the action of spring 568 and thus effect closing of the switch 570.

Means are provided whereby the aforementioned subtract control relay 38 is effective upon energization to automatically depress the subtract bar 502. For this purpose the arm 564 associated with the subtract bar is connected through a link 571 to the armature 572 of the subtract solenoid 29, the latter being suitably secured to the machine framework through a bracket 573.

Means are likewise provided for enabling the add control solenoid 23 upon energization to depress the add bar 501 to cause operation of the machine. The add bar has a key stem 574 thereof connected through a pin and slot coupling 575 to an arm 576 suitably secured on a rock shaft 577 to which is also secured a second arm 578 (Fig. 12). The latter arm has a roller 580 mounted thereon and engageable with the camming surface 581 formed on the forward end of the clutch control bar 558. Thus depression of the add bar will effect clockwise rocking movement of the shaft 577 to cause engagement of the clutch and operation of the machine. The add control solenoid 23 which is suitably secured to the framework of the machine has its armature 582 connected by a link 583 to the pin 575 associated with the arm 576 so that energization of the solenoid will rock the shaft 577 to cause operation of the machine.

Means are also provided for enabling the subtotal control solenoid 39 to depress the subtotal control bar 504 and cause operation of the machine. For this purpose the arm 564*a* associated with the subtotal control bar is in the form of a bell crank and is provided with a pin 582 engageable by a lever 583 pivoted on a frame pin 584 and coupled through a pin and slot connection to the subtotal control solenoid armature 585. The solenoid 23 is mounted on the machine framework through a bracket 586 and upon energization thereof its armature will rock the lever 583 counterclockwise, thereby rocking the arm 564*a* to effect engagement of the main clutch.

*Accumulator positioning controls*

As noted hereinbefore, the accumulator 507 (Fig. 11) is raised or lowered to mesh the accumulator gears with the upper or lower rack gear sections of the racks 506 depending on the type of operation to be performed. For this purpose, mechanism (shown in Fig. 15) is provided under control of the different machine control bars for effecting proper positioning of the accumulator.

The accumulator shaft has provided on opposite ends thereof rollers 587, each of which is embraced by a cam groove formed in a box cam 588. The latter is pivoted on a frame pin 590 and is normally held in its neutral illustrated position by a centralizer 591. The latter is pivoted on a frame pin 592 and is urged clockwise by tension spring 593 to normally maintain a roller 594 thereon in a centralizing notch 595 formed on the lower periphery of the cam 588. In this position of the cam 588 the accumulator will be held in its neutral position illustrated in Fig. 10.

Clockwise rocking of the cam 588 will raise the accumulator into its add position, whereas counterclockwise rocking of the cam from its neutral position will lower the accumulator into its subtrack position. For the purpose of selectively rocking the cam 588 to raise or lower the accumulator, the cam carries a pair of pins 596 and 597 located on opposite sides of the pivot pins 590. The pins 596 and 597 are adapted to be selectively engaged by a double hook member 598. The latter is pivotally connected to a three-arm cam follower 600 fulcrumed on the aforementioned shaft 534. The cam follower is urged counterclockwise by a tension spring 601 to maintain a roller 602 thereon against the periphery of a cam 603 keyed on the main drive shaft 527. The cam 603 has a high portion extending substantially half-way around its periphery. It should be noted that the shaft 527 is rotated in a counterclockwise direction, one revolution for each machine cycle, and therefore the cam 603 will be effective to rock the cam follower 600 and thereby move the hook 598 rearward and hold it in a rearward position during approximately the first half of a machine cycle.

Normally during adding operations or when the machine is at rest, the hook member 598 is held in its raised position shown in Fig. 15 by a tension spring 604, thereby maintaining the same in embracement with the pin 596 so that as the hook member is moved rearward by the cam 603 it will rock the accumulator positioning cam 588 clockwise to raise the accumulator into its add entry position relative to the rack.

Means are provided for locating the hook member 598 in a lower position in coupled engagement with the pin 597 in response to depression of the subtract, total or subtotal bars. For this purpose a control bar 605 is suspended for fore and aft movement relative to the machine by a pair of parallel links 606 and 607 pivoted on frame pins 608. The bar 605 is provided with camming surfaces thereon, one of which is indicated at 610 underlying the control bar operated pins 563. The control bar 605 is connected to the hook member 598 through a bell crank 611 pivoted on a frame pin 612 and coupled through a pin and slot connection 613 to the control bar 605 and through a second pin and slot connection 614 to the hook member 598.

The camming surfaces like surface 610 on the accumulator positioning control bar 605 are so formed that upon depression of the subtract, total or subtotal bars the control bar 605 will be moved forward its fullest extent, whereby to lower the hook member 598 into coupling engagement with the pin 597. Consequently, upon rearward movement of the hook member 598 the cam 588 will be rocked counterclockwise to lower the accumulator into its subtract position.

During adding, subtracting and totaling operations and after the high portion of the cam 603 has passed the roller 602, the spring 601 becomes effective through the cam follower 600 to return the hook member 598 and consequently the accumulator to its neutral position before the racks return from their advanced positions. However, in subtotalling operations the accumulator must be held in mesh with the racks during return movement of the racks in order to reset the accumulator to its former value after the subtotal amount has been printed. Therefore it is necessary in subtotalling operations to maintain the accumulator in mesh with the drive racks 506 throughout the major portion of a machine cycle. For this purpose a second cam 615 is keyed on the drive shaft 527 in juxtaposition with the cam 603. The latter cam engages a roller 616 mounted on a second cam follower 617 also pivoted on the shaft 534 and urged counterclockwise by a tension spring 618.

It will be noted that the cam follower 617 extends rearward to a greater extent than does the follower 600. A slot 620 is formed in the rearwardly extending arm of follower 617 and normally lies coextensive with a shorter slot 621 in the follower 600. A pin 622 carried by a link 623 lies in one or both of the slots 620 and 621, depending on the position of the link 623. The forward end of the link is connected through pin 582 to the arms **564*a* associated with the subtotal bar. When the subtotal bar is in its raised position the link 623 will be held rearward by a tension spring 624 wherein the pin 622 will lie solely within the slot 620. In this condition of the parts, the hook 598 will be under the sole control of the cam 603 and will consequently return the accumulator to neutral before return of the racks from their advanced position. However, in cases where the subtotal bar has been depressed, the pin 622 will be located within both slots 620 and 621. In this case, i. e., during subtotaling operations, both cam followers 600 and 617 will move as a unit due to pin 622, and will be controlled by the cam 615** to hold the accumulator engaged with the drive racks during both forward and return rack movement.

Means are provided whereby the aforementioned machine control switch is held closed during the first operation of each machine cycle. For this purpose the switch is suitably mounted, in a manner not shown, on the machine framework and is controlled by a lever 625 pivoted at 626 and urged clockwise by a tension spring 627 tending to engage a switch plunger 628 which is effective upon depression thereof to close the switch. The lever 625 has an ear 630 thereon overlying the cam follower 600. Thus, as the cam 603 rocks the cam follower 600 clockwise at the start of a machine cycle, the spring 627 will become effective to cause lever 625 to depress the plunger 628 to close the switch contacts. As was noted hereinbefore, the latter switch is effective to suspend operation of the scanning circuit until the machine has completed the major portion of a current cycle.

As noted hereinbefore, the value 100 is entered into the machine 21 additively or subtractively, depending upon the setting of the add-subtract switch as an incident of one hundred pulses in one or the other of the counters A and B. For this purpose the amount key **509*a* (Figs. 1 and 13) in the hundreds order or third to the left of the right-hand order in Fig. 12, is automatically depressed upon energization of its associated solenoid 22. The armature 631 of solenoid 22 is connected through a link 632 to one leg of a bail 633, the legs of which are pivoted on the aforementioned rock shaft 577. An extension 634 of the bail is interposed between the plunger 635 of the "1" key in the hundreds order and its aligned key stem. Thus, energization of the solenoid 22 will rock the bail 633 to depress the number "1" sub key stem 515**.

Although I have described my invention in detail in its preferred form and have utilized certain specific terms and language herein, it is to be understood that the present disclosure is illustrative rather than restrictive and that changes and modifications may be made without departing from the spirit and the scope of the claims appended hereto.

For example, in the foregoing disclosure, the counting units incorporate gaseous, glow discharge type counter tubes. While the latter are adequate for intermediate speed counting at rates on the order of 500 pulses per second or less, binary counters of the high vacuum tube type as, for example, disclosed in the patent to J. Potter, 2,538,122, issued on January 16, 1951, may be equally well adapted with obvious modifications, where higher speed counting is desired.

Also, although only two cascaded counted decades are provided for each of the counters A and B, it will be readily seen that three or more decades may be substituted to effect a greater scaling down rate of counting, such additional counting decades being accompanied by associated decade selector relays to effect sequential scanning of all such decades.

Having thus described the invention, what I desire to secure by United States Letters Patent is:

1. An electric computing system comprising the combination of a pair of electric pulse counters, a pulse input circuit, a gating circuit having two pulse output lines connected to respective ones of said counters, and a pulse input line connected to said pulse input circuit for receiving pulses to be counted, said gating circuit being effective to maintain one of said output lines effective and the other inffective to transmit pulses to said respective counters, a control circuit operatively associated with said gating circuit and responsive to a control pulse transmitted thereto at random and independently of said pulses to be counted for causing said gating circuit to render said previously effective output line ineffective and said previously ineffective output line effective, a bistable two condition trigger circuit adapted to be set in a first condition by pulses applied to said pulse input line and adapted to be set in a second condition by a signal pulse, and means responsive only to a change of said trigger circuit from said second condition to said first condition for transmitting a control pulse to said control circuit.

2. In an electric computing system, the combination comprising a pair of electric pulse transmission circuits, a pulse input circuit responsive only to the advance portion of a pulse to be transmitted, means for switching said input circuit from one of said transmission circuits to the other, a bi-stable two-condition trigger circuit responsive only to the trailing portion of said pulse for assuming said trigger circuit being responsive only to a signal pulse received at random and independently of pulses to be transmitted for assuming a second condition, and means responsive to a change of said trigger circuit from said second condition to said first condition only for causing operation of said switching means.

3. An electric computing system comprising the combination of a pair of electric pulse transmission circuits, a bi-stable two-condition trigger circuit responsive only to the trailing portion of a pulse to be transmitted for assuming a first condition and responsive only to a signal pulse received at random and independently of pulses to be transmitted for assuming a second condition, a gating circuit having two output lines connected to respective ones of said transmission circuits, and an input line for receiving pulses to be transmitted, said gating circuit being responsive only to the leading portion of a pulse to be transmitted for transmitting said last mentioned pulse to one or another of said output lines, said gating circuit being effective to normally maintain one of said output lines effective and the other ineffective, and means responsive to a change of said trigger circuit from said second condition to said first condition only for causing said gating circuit to render said previously effective output line ineffective and to render said previously ineffective output line effective.

4. An electric computing system comprising the combination of a pair of electric pulse transmission circuits, a gating circuit having two pulse output lines connected to respective ones of said transmission circuits, said gating circuit being effective to render one of said output lines effective and the other ineffective, a first bi-stable two-condition trigger circuit settable in a first condition by pulses being transmitted through said transmission circuits and settable in a second condition by a signal pulse transmitted at random and independently of said transmitted pulses, a second bi-stable two-condition trigger circuit, means responsive to a change of said first trigger circuit from said second condition to said second condition only for setting said first trigger circuit from one of said conditions thereof to the other, and means controlled by said second trigger circuit upon a change in the condition thereof for causing said gating circuit to render said previously effective output line ineffective and for rendering said previously ineffective output line effective.

5. An electric computing system comprising the combination of a pair of electric pulse counters, means including a read-out device for reading out amounts registered in either of said counters, a gating circuit having two pulse output lines connected to respective ones of said counters, said gating circuit rendering one of said output lines effective and the other ineffective, a bi-stable two-condition trigger circuit adapted to be set in a first condition by pulses being counted and adapted to be set in a second condition by read-out control pulses, a second bi-stable two-condition trigger circuit, means responsive to a change of said first-mentioned trigger circuit from said second condition to said first condition only for setting said second trigger circuit from one of said conditions thereof to the other, means responsive to a change in said second trigger circuit from either of said conditions thereof to the other for causing said gating circuit to render said previously effective output line ineffective and to render said previously ineffective output line effective, and means responsive to said change of said first-mentioned trigger circuit for causing said read-out device to read out amounts from the counter connected to said ineffective line only.

6. In an electric computing system, the combination comprising a pair of electric pulse counters, each comprising a plurality of counter decades, means including a read-out device for reading out of either of said counters, a pulse switching circuit for switching pulses to be counted from one of said counters to the other, means for causing operation of said switching circuit, scanning means for causing said read-out device to sequentially read out of different ones of said counter decades of one of said counters, a bistable two condition trigger circuit adapted to be set in a first condition by a pulse to be counted and adapted to be set in a second condition by a signal pulse, and means operable by said trigger circuit in response to a change of said trigger circuit from said second condition to said first condition only for operating said switching means.

7. In an electric computing system, the combination of a pair of electric pulse counters, means including a read-out device for reading out of either of said counters, a count pulse input circuit, means for switching said input circuit from one of said counters to the other, means for initiating operation of said switching means, said last mentioned means comprising a bi-stable two-condition trigger circuit operatively connected to said input circuit and to a source of signal pulses, said trigger circuit being adapted to be set in a first condition by count pulses applied to said input circuit and adapted to be set in a second condition by a said signal pulse, and means responsive to a change of said trigger circuit from said second condition to said first condition only for instituting operation of said switching means; a delay circuit activated by a count pulse, means controlled by said switch initiating means and said delay circuit and operable only in the absence of a count pulse for a predetermined period of time for causing said switching means to switch said input circuit, and means responsive to operation of said switching means for causing said read-out device to read out of said other counter.

8. In an electric computing system, the combination comprising a pair of electric pulse counters, a pulse input circuit, means for switching said input circuit from one of said counters to the other, a bi-stable two-condition trigger circuit normally adapted to be set in a first condition by count pulses to be counted, and adapted to be set in a second condition by signal pulses received at random and independently of said pulses to be counted, means responsive to a change of said trigger circuit from said second condition to said first condition only for causing operation of said switching means, and means responsive to said signal pulses only in the absence of count pulses for a predetermined period of time for setting said trigger circuit in said first condition.

9. An electric computing system comprising the combination of a pair of electric pulse counters, means including a read-out device for reading out amounts registered in either of said counters, a gating circuit having two output lines connected to respective ones of said counters, one of said output lines being effective and the other ineffective, a bi-stable two-condition trigger circuit, means responsive to a change of said trigger circuit from a first of said conditions to the second only for causing said gating circuit to render said previously effective output line ineffective and to render said previously ineffective line effective, a circuit responsive to said trigger circuit upon said last-mentioned change thereof for causing said read-out device to read out of the counter connected to said ineffective line, means normally responsive to count pulses to be counted for setting said trigger circuit in said second condition, means responsive to read-out control pulses for setting said trigger circuit in said first condition, and means responsive to said last-mentioned means in the absence of a count pulse for a predetermined period of time for setting said trigger circuit in said second condition.

10. In an electric computing system, the combination comprising a pair of electric pulse counters, a pulse input circuit, means for switching said input circuit from one of said counters to the other, a bi-stable two-condition trigger circuit, means responsive to a change of said trigger circuit from a first condition to a second condition only for causing operation of said switching means, a control circuit adapted to first set said trigger circuit in said first condition and to thereafter set said trigger circuit in said second condition, means operable at random and independently of pulses to be counted for actuating said control circuit to said trigger circuit in said first condition, a second control circuit controlled by pulses to be counted, and means controlled by said second control circuit for preventing said first-mentioned control circuit from setting said trigger circuit in said second condition for a predetermined period, and for directly setting said trigger circuit in said second condition.

11. An electric computing system comprising the combination of an electric pulse counter, means including a read-out device for reading out of said counter, a bi-stable two-condition trigger circuit adapted to be set in a first condition by pulses being counted and adapted to be set in a second condition by signal pulses received at random and independently of said pulses being counted, a gating circuit for gating pulses to be counted by said counter, and means responsive to a change of said trigger circuit from said second condition to said first condition only for causing said gating circuit to transmit said pulses to be counted.

12. In an electric computing system, the combination of a pulse utilization circuit, a pulse input circuit for said utilization circuit, a gating circuit connected to said input circuit for gating pulses transmitted by said input circuit, said gating circuit being responsive only to the leading portion of a transmitted pulse for actuating said utilization circuit, means comprising a bistable two-condition trigger circuit responsive only to the trailing portion of a transmitted pulse for assuming one condition, said trigger circuit being responsive only to a signal pulse received independently of said transmitted pulses and at random relative thereto for assuming a second condition, and means responsive to a change in said trigger circuit from said second condition to said first condition only for causing said gating circuit to transmit said first-mentioned pulses.

13. In an electric computing system, the combination of a pulse utilization circuit, a pulse input circuit for said utilization circuit, a gating circuit for gating pulses transmitted by said input circuit, said gating circuit being responsive only to the leading portion of a pulse for actuating said utilization circuit means comprising a bistable two-condition trigger circuit responsive only to the trailing portion of a said pulse for assuming one condition and adapted to be set in a second condition by a signal pulse received at random and independently of said first mentioned pulses, and a second bistable two-condition trigger circuit, means responsive to a change of said first-mentioned trigger circuit from said second condition to said first condition only for setting said second trigger circuit from one of said conditions to the other, and means controlled by said second trigger circuit upon a change in the condition thereof for actuating said gating circuit.

14. In an electric computing system, the combination comprising a pulse utilization circuit, a pulse input circuit for said utilization circuit, a gating circuit for gating pulses transmitted by said input circuit, a bistable trigger circuit, means responsive to a change of said trigger circuit from a first condition to a second condition only for causing said gating circuit to transmit said pulses, a control circuit responsive to a signal pulse received at random and independently of said first mentioned pulses, said control circuit being effective to first set said trigger circuit in said first condition and thereafter set said trigger circuit in said second condition, a second control circuit controlled by pulses applied to said input circuit, and means controlled by said second control circuit for preventing said first-mentioned circuit from setting said trigger circuit in said second condition for a predetermined period and for directly setting said trigger circuit in said second condition.

References Cited in the file of this patent

UNITED STATES PATENTS

| | | |
|---|---|---|
| 2,409,689 | Morton | Oct. 22, 1946 |
| 2,483,644 | Kelsey | Oct. 4, 1949 |
| 2,595,889 | Ryffel et al. | May 6, 1952 |
| 2,601,491 | Baker | June 24, 1952 |
| 2,601,492 | Baker | June 24, 1952 |
| 2,604,262 | Phelps | July 22, 1952 |
| 2,611,813 | Sharpless | Sept. 23, 1952 |
| 2,642,527 | Kelley | June 16, 1953 |
| 2,714,658 | Greenfield | Aug. 2, 1955 |
| 2,745,985 | Lewis | May 15, 1956 |

OTHER REFERENCES

Proceedings of the IRE; "Marginal Checking As an Aid to Computer Reliability" by Norman H. Taylor, (pages 1418–1421) December 1950.

Proceedings of the IRE; "Electronic Computing Circuits of the ENIAC" by A. W. Burks, (pages 756–767), August 1947.

UNITED STATES PATENT OFFICE

CERTIFICATE OF CORRECTION

Patent No. 2,793,806 May 28, 1957

John L. Lindesmith

It is hereby certified that error appears in the printed specification of the above numbered patent requiring correction and that the said Letters Patent should read as corrected below.

Column 2, line 28, for "oppearting" read -- operating --; column 25, line 15, for "inffective" read -- ineffective --; line 35, before "said" insert -- a first condition, --; same column 25, line 73, for "second", second occurrence, read -- first --; line 74, for "first" read -- second --.

Signed and sealed this 27th day of August 1957.

(SEAL)
Attest:

KARL H. AXLINE

Attesting Officer

ROBERT C. WATSON
Commissioner of Patents